May 5, 1970 J. N. PEARSE 3,510,842

RELAY TRANSFER SHIFT REGISTER MODULE

Filed Oct. 28, 1963 5 Sheets-Sheet 1

INVENTOR
JAMES N. PEARSE

BY Thomas O. Klodin

ATTORNEY

May 5, 1970 J. N. PEARSE 3,510,842

RELAY TRANSFER SHIFT REGISTER MODULE

Filed Oct. 28, 1963 5 Sheets-Sheet 2

INVENTOR
JAMES N. PEARSE

BY Thomas O. Kleber

ATTORNEY

May 5, 1970 J. N. PEARSE 3,510,842

RELAY TRANSFER SHIFT REGISTER MODULE

Filed Oct. 28, 1963 5 Sheets-Sheet 3

INVENTOR
JAMES N. PEARSE

BY

ATTORNEY

May 5, 1970 J. N. PEARSE 3,510,842

RELAY TRANSFER SHIFT REGISTER MODULE

Filed Oct. 28, 1963 5 Sheets-Sheet 4

INVENTOR
JAMES N. PEARSE

BY Thomas O. Kloehn

ATTORNEY

May 5, 1970 J. N. PEARSE 3,510,842

RELAY TRANSFER SHIFT REGISTER MODULE

Filed Oct. 28, 1963 5 Sheets-Sheet 5

INVENTOR
JAMES N. PEARSE

BY

ATTORNEY

United States Patent Office 3,510,842
Patented May 5, 1970

3,510,842

RELAY TRANSFER SHIFT REGISTER MODULE

James N. Pearse, Menomonee Falls, Wis., assignor to Allen-Bradley Company, Milwaukee, Wis., a corporation of Wisconsin Filed Oct. 28, 1963, Ser. No. 319,224
Int. Cl. G11c *19/00, 11/52*
U.S. Cl. 340—168 3 Claims

ABSTRACT OF THE DISCLOSURE

Each of the five shift registers comprise three or more modules. Each module transfers information with a relay having energizing and deenergizing windings to actuate its contacts. A similar relay provides the output for each module, and energizes and is deenergized by the transfer relay. The relays in the first embodiment have a pair of normally open contacts; those of the second and fourth, a single normally open contact; and those of the third, a pair of normally closed contacts. The first embodiment is also applied in a multidirectional shift register. The operation and structure of each is disclosed in detail.

Figure 1:
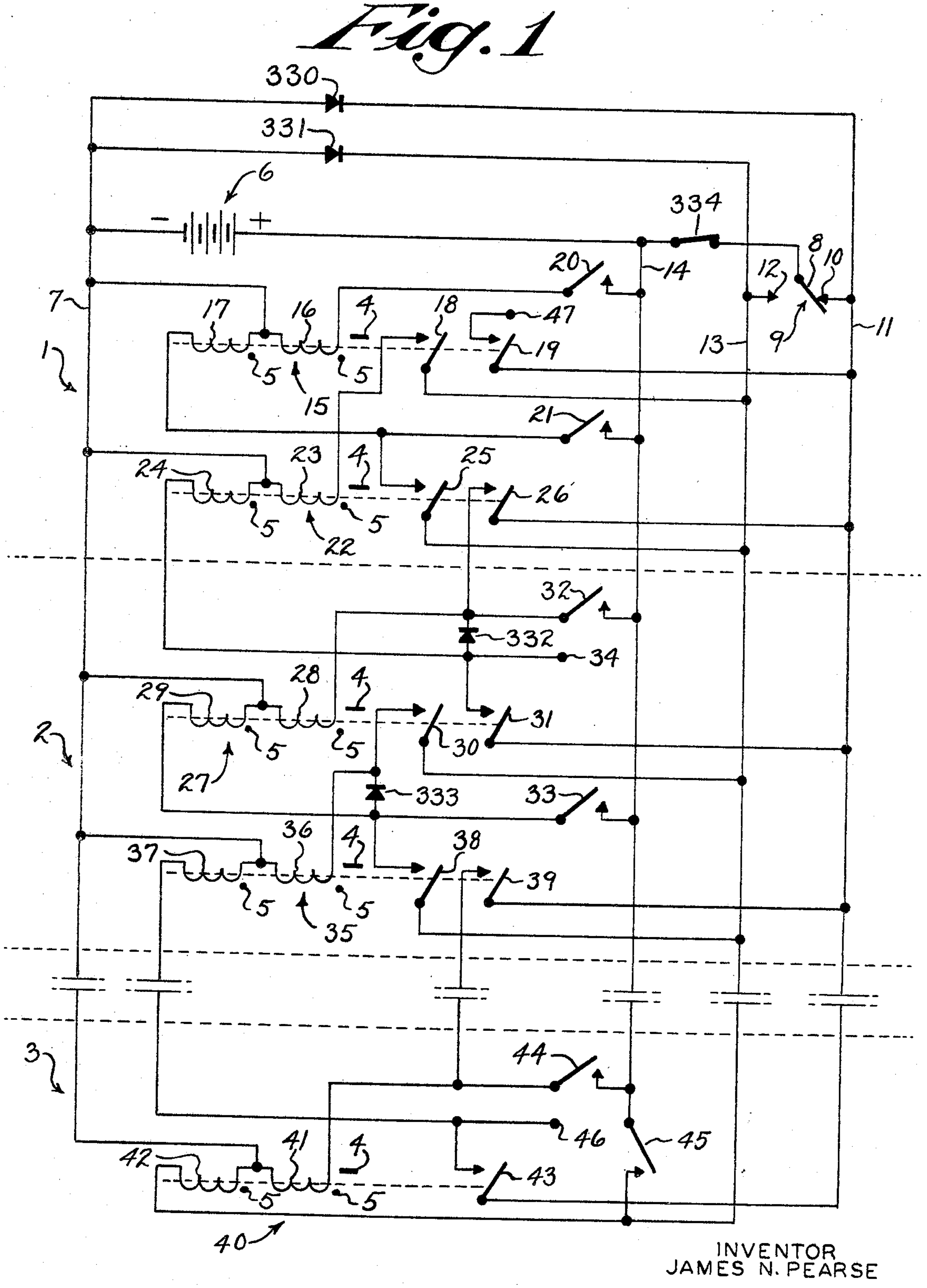

The present invention relates to a shift register module comprising an output device and a shifting device wherein said shifting device contains a latched relay having two windings and at least one contact, one of said windings being oriented to energize the relay and the other of said windings being oriented to return the relay to its normal condition. The invention also resides in a unidirectional shift register comprised of a plurality of said modules connected in succession; and finally the invention also resides in a multidirectional shift register comprised of a plurality of said modules.

Shift registers have long been standard components in various computers and numerical control devices. However, prior to the present invention the shift registers have been at least partially if not wholly electronic, semiconductor or a magnetic core member memory devices. As a result, the output signal from such shift registers was of small amplitude and required amplification for many applications.

Before the present invention such electronic, semiconductor or magnetic core devices were used exclusively to perform the shifting functions between the modules of the shift registers. The present invention provides a novel circuit utilizing a relay to perform the shifting function, and the embodiments disclosed also teach the use of relays to perform the output functions of the shift register. Hence, the output from a shift register embodying the present invention is immediately usable for any application without further amplification.

The present invention disclosed here also provides an asynchronous shift register. Electronic and other shift registers of the past have required synchronizing clocking signals for their operation, and they would function only at the rate of the synchronizing, clocking signal. The present invention is essentially asynchronous, although it may be modified for synchronous operation if desired as will be shown. A shift register of the present invention may be operated at any speed within the limitation of the specific components chosen, it will operate on a regular frequency or on an entirely erratic control, and it will store information fed into it for an indefinite period, even through shutdowns or power failures.

Accordingly, it is an object of the present invention to provide a shift register module capable of producing an immediately usable output signal.

It is another object of the present invention to provide a shift register module wherein a relay performs the shifting function.

It is another object of the present invention to provide an asynchronous shift register.

It is another object of the present invention to provide a shift register requiring a minimum number of components.

It is another object of the present invention to provide a highly stable and reliable shift register.

It is another object of the present invention to provide a multidirectional shift register.

It is another object of the present invention to provide a shift register that may operate synchronously or asynchronously.

It is another object of the present invention to provide a more versatile shift register than those hitherto available.

The foregoing and other objects will appear in the description to follow. In the description, reference is made to the accompanying drawings which form a part hereof and in which there is shown by way of illustration several specific embodiments in which this invention may be practiced. These embodiments will be described in sufficient detail to enable those skilled in the art to practice this invention, but it is to be understood that other embodiments of the invention may be used and that structural changes may be made in the embodiments described without departing from the scope of the invention. Consequently, the following detailed description is not to be taken in a limiting sense; instead, the scope of the present invention is best defined by the appended claims.

Figure 2:
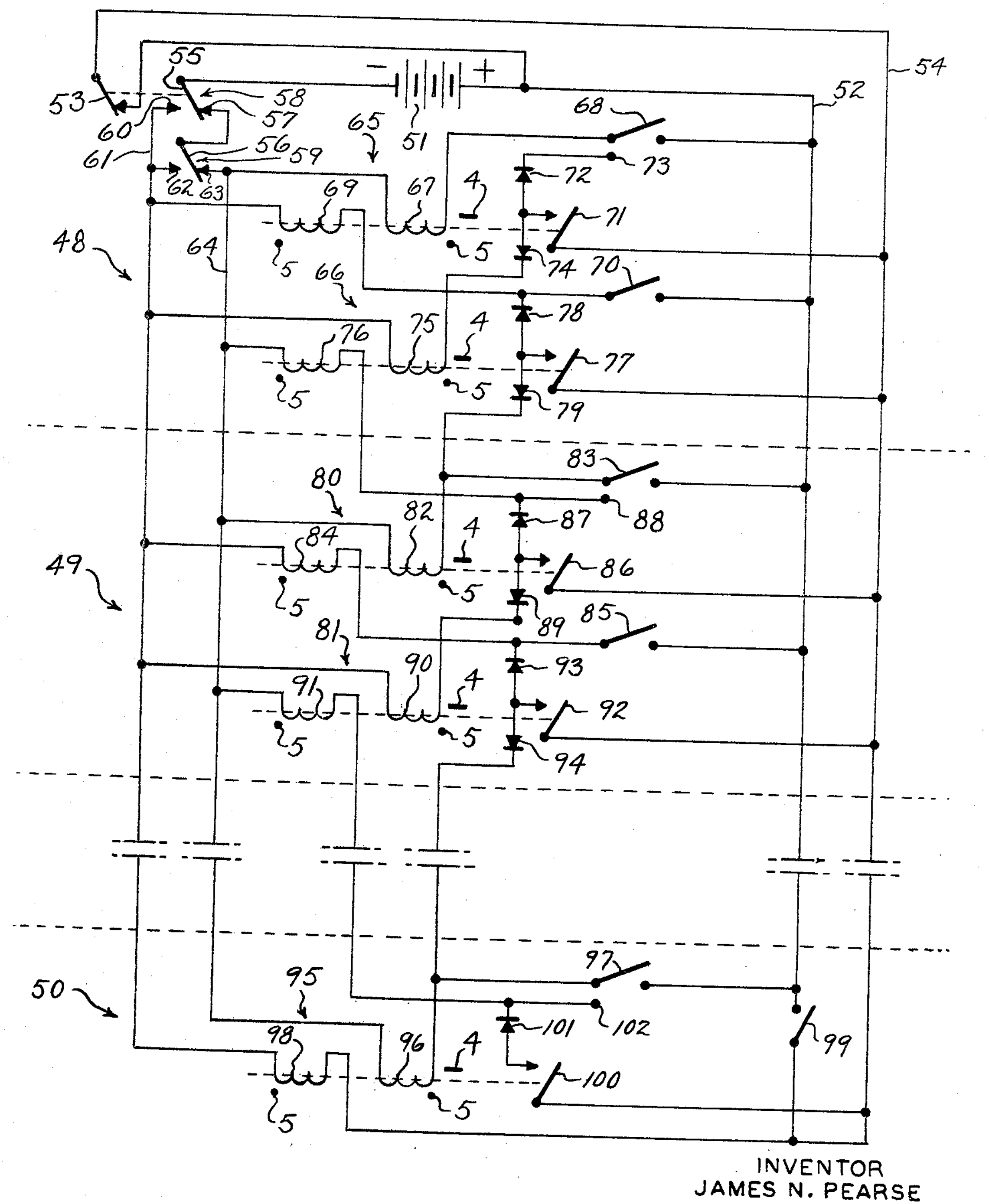
Figure 3:
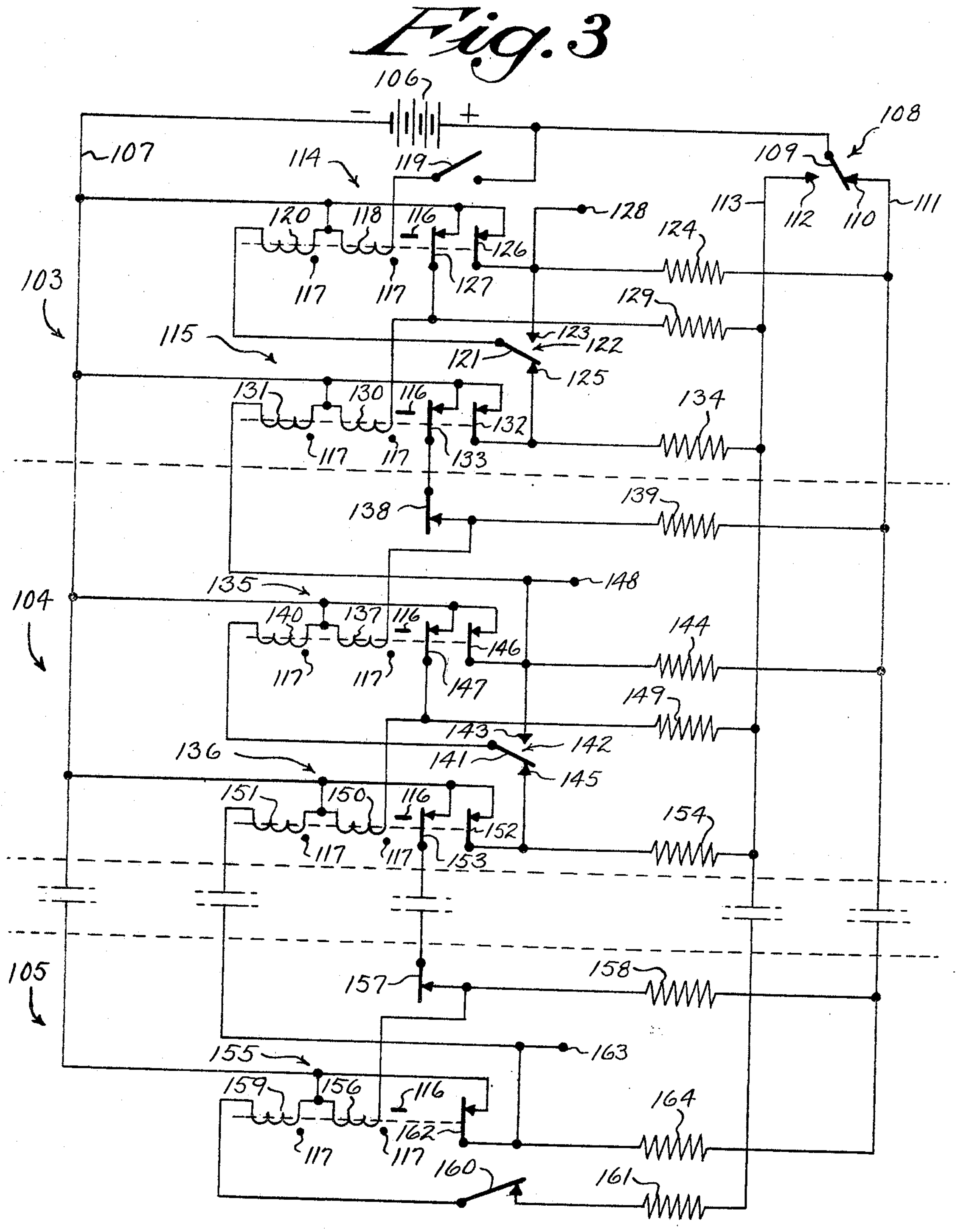
Figure 4:
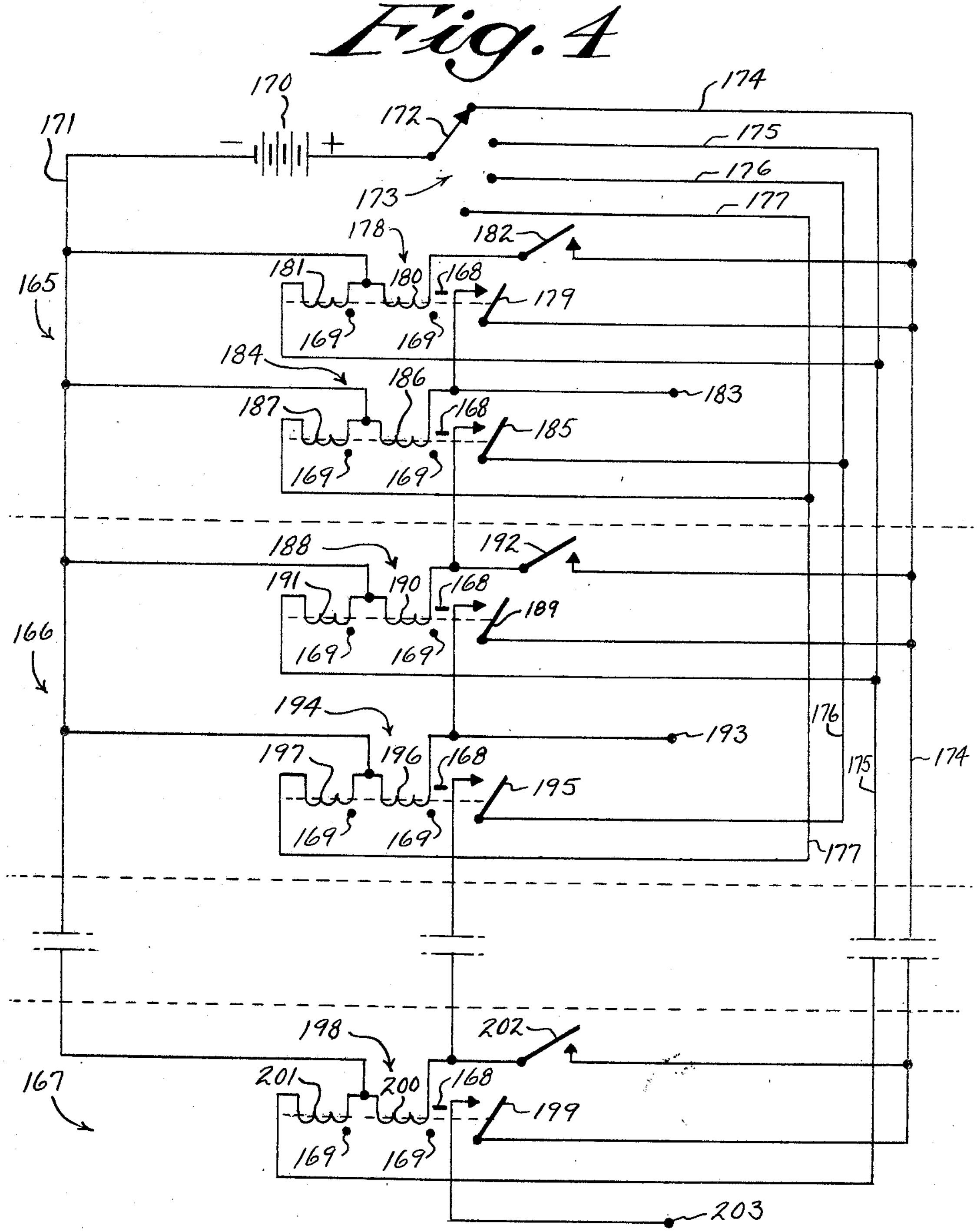
Figure 5:
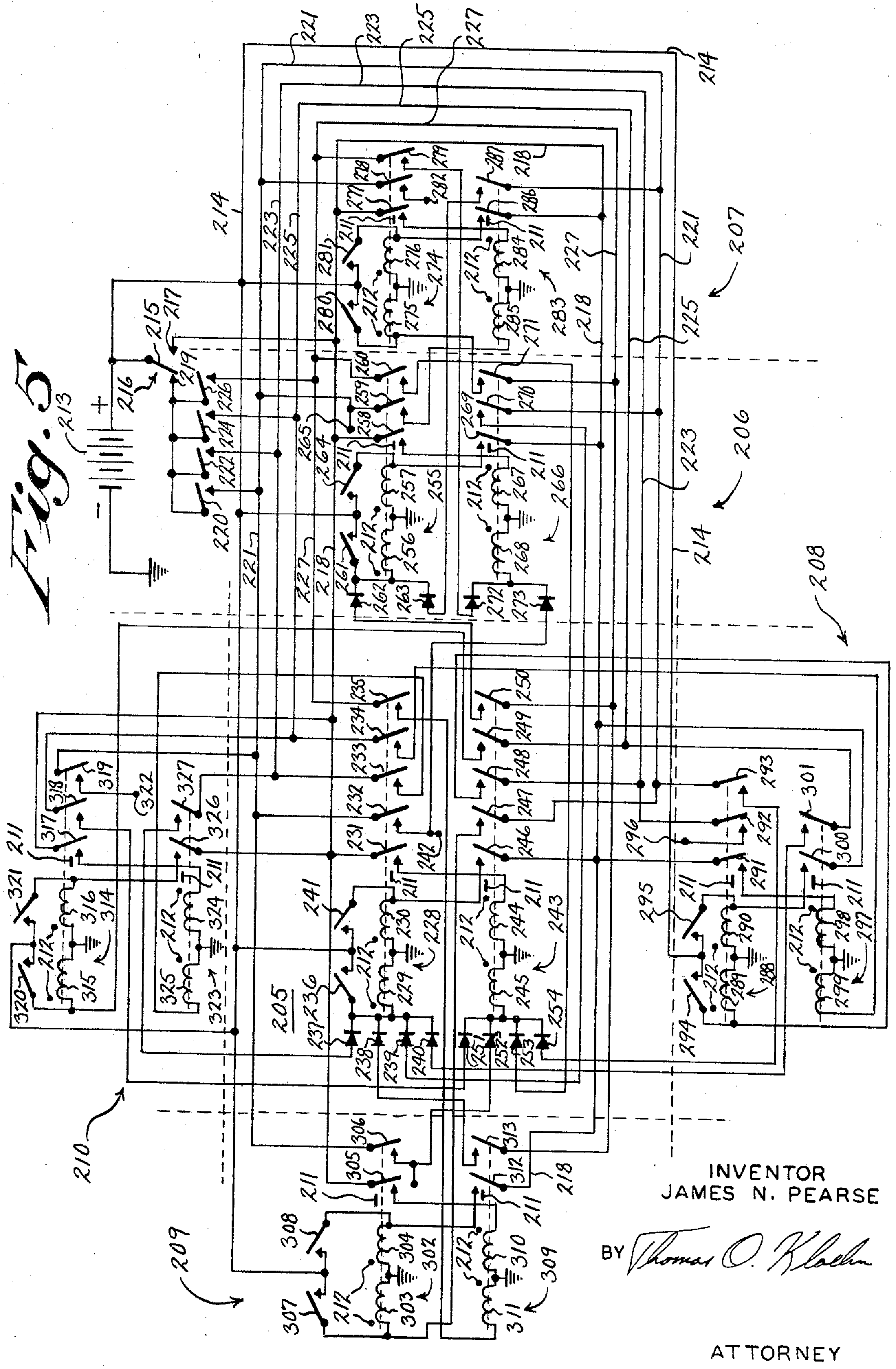

In the drawings:

FIG. 1 is a schematic diagram of a basic unidirectional shift register of three modules embodying the present invention, FIG. 2 is a schematic diagram of a modified form of the basic unidirectional shift register shown in FIG. 1, FIG. 3 is a schematic diagram of a second modified form of a basic unidirectional shift register, FIG. 4 is a still further modification of the basic unidirectional shift register shown in FIG. 1 by which modification the shift register is provided with external reset, and FIG. 5 is a schematic diagram of a basic multidirectional shift register embodying the present invention.

Each of the five figures in the drawings illustrates a different embodiment of the present invention, and due to the complexity of some of the circuitry, each embodiment will be described individually in the following paragraphs. However, certain generalizations may be made of all the embodiments, and such generalizations may aid in the understanding of the present invention, and the descriptions in succeeding pages. The embodiments referred to are each made up of three or more modules, which modules are set off by broken lines in the drawings. Each of the modules, shown in FIGS. 1 through 4, except the terminal modules has an output device and an input device, whereas the terminal module shown in FIGS. 1 through 4 have only an output device.

The output and input devices shown in each embodiment are very nearly identical to each other, and the central components of those devices are relays. The relays actually used in these embodiments are of the mercury wetted contact or sealed contact varieties, but that choice of components is governed by the intended application of the circuit, as other types of relays will perform the function equally well. The relays are magnetically latched so as to be stable in an energized condition as well as in a normal, deenergized condition. Each of the relays has at least one contact and two windings. The windings are so oriented, that one of the two windings will serve to energize the relay, and the other winding will function to overcome the latching mechanism to permit the relay to return to its normal, deenergized condition. Each of the five shift registers is adapted to transfer information serially, that is from a preceding module to a succeeding module; or in parallel, that is, to provide an output signal at each module; to receive information in parallel, that is, to be able to receive an input signal at each module; or to clear each module of any information which it might be holding.

FIRST EMBODIMENT

The first embodiment of the present invention is illustrated in FIG. 1 of the drawings, and it is comprised of three modules: an initial module 1, an intermediate module 2, and a terminal module 3. The modules are set off by horizontal broken lines, and in between the intermediate module 2 and the terminal module 3 the conductors are interrupted by break lines which are also set off between horizontal broken lines, and the purpose of the break lines is to illustrate in the diagram that the shift register shown in FIG. 1 may be extended to any desired length by inserting the appropriate number of intermediate modules 2.

Each of the first two modules 1 and 2 has an output device and an input device, but the terminal module 3 has only an output device. Each of the output devices and input devices contains a normally open relay having two windings and two normally open contacts. Each of the relays has a latching magnet 4, which is oriented to hold the normally open contacts closed after the relay has been energized by passing a unidirectional signal through one of its windings so that it will enter the winding from the end adjacent the polarity dot 5 and pass out of the winding from the end remote from the polarity dot 5.

A source of unidirectional current is provided in the form of the battery 6. The negative pole of the battery 6 is connected to a return conductor 7, and the positive pole of the battery 6 is connected to a common terminal 8 of a shift switch 9. The shift switch 9 is a double throw switch having a right stationary terminal 10 connected to an output conductor 11, and a left stationary terminal 12 connected to a shift conductor 13. The positive pole of the battery 6 is also connected to an input-cancel conductor 14.

In the initial module 1, an output relay 15 is central to the output device. The output relay 15 has a close-contact winding 16, an open-contact winding 17, a transfer contact 18 and an output contact 19. The close-contact winding 16 has its end adjacent the polarity dot 5 connected through an input switch 20 to the input-cancel conductor 14, and it has its end remote from the polarity dot 5 connected through the return conductor 7 to the negative pole of the battery 6. The open-contact winding 17 has its end adjacent the polarity dot 5 connected through the return conductor 7 to the negative pole of the battery 6, and it has its end remote from the polarity dot 5 connected, first, to the shifting device in the initial module, and then through a cancel switch 21 to the input-cancel conductor 14. The transfer contact 18 is connected between the shift conductor 13 and the shifting device. The output contact 19 is connected between the output conductor 11 and an output terminal 47.

The shifting device of the first module has a shift relay 22 with a close-contact winding 23 and an open-contact winding 24, a cancel contact 25 and a shift contact 26. The close-contact winding 23 has an end adjacent the polarity dot 5 connected through the transfer contact 18 to the shift conductor 13, and it has an end remote from the polarity dot 5 connected through the return conductor 7 to the battery 6. The open-contact winding 24 has an end adjacent the polarity dot 5 connected through the return conductor 7 to the battery 6, and an end remote from the polarity dot 5 connected to the intermediate module 2. The cancel contact 25 is connected between the shift conductor 13 and the open-contact winding 17 of the output relay 15. The shift contact 26 is connected between the output conductor 11 and the intermediate module 2.

The intermediate module 2 also has an output device and a shifting device, and the output device includes an output relay 27 which has a close-contact winding 28, an open-contact winding 29, a transfer contact 30 and an output contact 31. The close-contact winding 28 has an end adjacent the polarity dot 5 connected through the shift contact 26, in the shift relay 22 of the first module, to the output conductor 11, and an end remote from the polarity dot 5 connected through the return conductor 7 to the negative pole of the battery 6. The open-contact winding 29 has an end adjacent the polarity dot 5 connected through the return conductor 7 to the battery 6, and it has an end remote from the polarity dot 5, which end is connected to the shifting device and to the input-cancel conductor 14 through a cancel switch 33. The transfer contact 30 is connected between the shift conductor 13 and the shifting device. The output contact 31 is connected between the output conductor 11 and both the output terminal 34 and the open-contact winding 24 in the shift relay 22 of the initial module 1.

The shifting device of the intermediate module 2 consists of a shift relay 35 which has a close-contact winding 36, an open-contact winding 37, a cancel contact 38 and a shift contact 39. The close-contact winding 36 has an end adjacent the polarity dot 5 connected to the transfer contact 30 of the output relay 27, and an end remote from the polarity dot 5 connected through the return conductor 7 to the battery 6. The open-contact winding 37 has an end adjacent the polarity dot 5 connected to the return conductor 7 to the battery 6, and an end remote from the polarity dot 5 connected to a succeeding module, which in this case is the terminal module 3. The cancel contact 38 is connected between the shift conductor 13 and the open-contact winding 29 of the output relay 27. The shift contact 39 is connected between the output conductor 11 and a succeeding, terminal module 3.

The terminal module 3 has only an output device, which is made up, in large part, of an output relay 40 having a close-contact winding 41, an open-contact winding 42 and an output contact 43. The close-contact winding 41 has an end adjacent the polarity dot 5 which is connected to the shift contact 39 in the preceding intermediate module 2, and through an input switch 44 to the input-cancel conductor 14, and an end remote from the polarity dot 5 connected through the return conductor 7 to the battery 6. The open-contact winding 42 has an end adjacent the polarity dot 5 which is connected to the return conductor 7 to the battery 6, and an end remote from the polarity dot 5, which end is connected to the shift conductor 13, and to the input-cancel conductor 14 through a cancel switch 45. The output contact 43 is connected between the output conductor 11 and an output terminal 46, and between the output conductor 11 and the open-contact winding 37 of the shift relay 35 in the preceding intermediate module 2.

To compensate for certain characteristics of dry reed type relays shown in this embodiment, several diodes are inserted in the circuit. The magnetic circuits of the two coils in each of the dry reed relays 15, 22 and 35 are unavoidably closely linked. Since the coils are connected in parallel, a current induced in one coil by the energization of its mate could, under some conditions, be circulated through coils of the other relays, and to avoid undesirable effects of that eventuality, diodes 330 and 331 are connected between the negative pole of the source 6 and output and shift conductors 11 and 13. Also, due to inevitable inequalities between the various dry reed contact assemblies, a marginal signal may activate only one of two contacts, leaving the other in its original condition. By installing the diodes 332 and 333 such marginal signals are avoided and the potential malfunction obviated. However, the installation of those diodes 332 and 333 requires that the switch 334 be added between the positive pole of the source 6 and the common terminal 8 to interrupt that circuit whenever it is desired to cancel information by closing one of the cancel switches 21, 33 or 45.

To operate the first embodiment of the present invention, beginning with shift registers as shown in FIG. 1, information may be fed into the shift register by closing the input switch 20 so that current may flow from the positive pole of the battery 6 through the input-cancel conductor 14, the input switch 20, to enter and pass through the close-contact winding 16 of the output relay 15 from the end adjacent the polarity dot and return to the negative pole of the battery 6 through the return conductor 7. That signal will cause the transfer contact 18 and the output contact 19 to close and the contacts will be held in closed position by the latching magnet 4. At this point, information may be read out of the initial module 1 from the output terminal 47. The shift register will remain dormant until the common terminal 8 of the shift switch 9 is moved into contact with the left stationary terminal 12, and when this is accomplished current may flow from the positive side of the battery 6 through the shift switch 9, the transfer contact 18, to enter and pass through the close-contact winding 23 of the shift relay 22 from its end adjacent the polarity dot 5 and return to the negative pole of the battery 6 through the return conductor 7. That signal will cause the cancel contact 25 and the shift contact 26 to close.

The contacts 25 and 26 in the shift relay 22 will be held closed by the latching magnet 4, and current may pass through the shift switch 9, the shift conductor 13, and the cancel contact 25, to the open-contact winding 17 of the output relay 15, entering from its end remote from the polarity dot 5 and returning to the battery through the return conductor 7. That signal will cause an electromagnetic field to be built up, canceling the field of the latching magnet 4 and permitting the contacts 18 and 19 in the output relay 15 to return to their normal, open position. That same result could also have been achieved by closing the cancel switch 21 so that a signal might have passed from the positive pole of the battery 6 to the input-cancel conductor 14, the cancel switch 21 and the open-contact winding 17 of the output relay 15. Information has now been cleared out of the output relay and is being stored in the shift relay 22.

By moving the common terminal 8 to the shift switch 9 over to the right stationary terminal 10 as is shown in the drawings, current will find a path from the positve pole of the battery 6 through the shift switch 9, and the output conductor 11, through the shift contact 26 of the shift relay 22 to enter the polarity dot end of the close-contact winding 28 of the output relay 27 in the intermediate module 2, and back to the negative pole of the battery through the return conductor 7. That signal will have the effect of closing the contacts 30 and 31 in the output relay 27. The same results could have been achieved by closing the input switch 32 so that current could pass from the positive pole of the battery 6 through the input-cancel conductor 14 and through the close-contact winding 28 as indicated. Hence, information can be fed to the intermediate module 2 either serially as was indicated first, or in parallel by closing the input switch 32. In either event, the output relay 27 is energized and its transfer contact 33 and its output contact 31 are closed.

The closing of the output contact 31 has two effects: first it places an output signal on the output terminal 34; and second, a current passes from the positive pole of the battery 6 through the shift switch 9, the output conductor 11, the output contacts 31, to the open-contact winding 24 of the shift relay 22, entering from the end remote from the polarity dot 5 and returning to the negative pole of the battery to the return conductor 7. This latter signal will overcome the latching magnet 4 in the shift relay 22 of the first module permitting its contacts 25 and 26 to open to clear the first module of the information. The information is now in the output relay 27 and cleared from the initial module 1.

The output relay 27 of the intermediate module 2 could be cleared by closing the cancel switch 33 to permit current to flow from the battery 6 through the input-cancel conductor 14, and the cancel switch 33 to the open-contact winding 29 of the output relay 27. However, for the information to progress serially through the shift register, the common terminal 8 of the shift switch 9 must be moved into contact with the left stationary terminal 12 so that current may flow through the shift switch 9, the shift conductor 13, the transfer relay 30 in the output relay 27 to the polarity dot end of the close-contact winding 36 of the shift relay 35, and from there through the close-contact winding 36 and the return conductor 7 back to the negative pole of the battery 6. That signal will energize the shift relay 35, closing its cancel contact 38 and its shift contact 39. Current may then pass from the battery 6 through the shift switch 9, the shift conductor 13, the cancel contact 38 and the open-contact winding 29 of the shift conductor 27, back to the battery 6 through the return conductor 7. That signal will cancel the latching magnet 4 field, permitting the contacts 30 and 31 in the output relay 27 to open, thus clearing the output relay 27.

The information may be shifted to the terminal module 3 by moving the common terminal 8 of the shift switch 9 into contact with the right stationary terminal 10, to complete a current path from the positive pole of the battery 6 through the shift switch 9, the output conductor 11, and the shift contact 39 to the close-contact winding 41 of the relay 40 in the terminal module 3. That current path will permit a signal to pass through the close-contact winding 41, entering from its polarity dot end, and return to the negative pole of the battery 6 through the return conductor 7, energizing the relay 40 and closing its output contact 43. When the output contact 43 is closed, current may pass from the output conductor 11 through the output contact 43 to present an output signal to the output terminal 46, and to pass a current through the open-contact winding 37 of the shift relay 35 in the intermediate module 2, entering from its end remote from the polarity dot 5 and returning to the negative pole of the battery 6 through the return conductor 7. Thus, the intermediate module 2 is cleared of information, which now is being stored in the output relay 40 of the terminal module 3.

To clear the terminal module 3 of information, one of two things may be done: the cancel switch 45 may be closed to permit current to pass from the positive pole of the battery through the input-cancel conductor 14, the cancel switch 45 and the open-contact winding of the relay 40 and back to the battery through the return conductor 7; or the common terminal 8 of the shift switch 9 may be moved into contact with the left stationary terminal 12 so that current will pass from the battery 6 through the shift switch 9 and the shift conductor 13 to the open-contact winding 42 of the relay 40 and thence back to the battery 6 as was described. In either event, a signal passes through the open-contact winding 42, entering from its end remote from the polarity dot 5, to create a magnetic field which cancels that of the latching magnet 4 permitting contact 43 to open. Again, information could be fed into the terminal module in parallel by closing the input switch 44, as distinguished from feeding it in serially as was described above.

A number of obvious modifications in the above described embodiment present themselves within the scope of the present invention. For example, the shift register might be converted to a ring register, by eliminating the terminal module 3 and connecting the shift contact 39 in the shift relay 35 of the intermediate module to the polarity dot end of the close-contact winding 16 in the output relay 15 of the initial module 1, so that by actuating the shift switch 9 the information would continually circulate and recirculate through the shift register. Also, although a relay is used as an output device in each of the modules, any appropriate flip-flop could be used for the same purpose. A suitable signal generator might be substituted for the battery 6 and the shift switch 9. Also, input and cancel signals might come from a wholly external source of appropriate amplitude and polarity. Those, and other variations do not depart from the essential idea of the shift relay and associated circuitry described above.

SECOND EMBODINENT

The second embodiment of the present invention as shown in FIG. 2 of the drawing varies from the first embodiment shown in FIG. 1 in that it eliminates one of the two contacts in each relay shown in FIG. 1 and it adds two diodes in conjunction with each relay. The purpose of the two diodes is, of course, to block off undesired current paths created by the use of one contact to perform the work of two.

Referring now specifically to FIG. 2, three modules, the initial module 48, an intermediate module 49, and the terminal module 50 are shown in the drawings, set off from one another by horizontal broken lines. Between the intermediate module 49 and the terminal module 50 break lines are inserted across the various conductors to call attention to the fact that in actual practice a shift register, in all likelihood, would contain many more than three modules and this embodiment could contain as many modules as desired by inserting at the break line the appropriate number of intermediate modules 49.

At the top of FIG. 2 a common source of unidirectional current, in the form of a battery 51 is illustrated for the operation of the shift register. The battery 51 has its positive pole connected directly to an input-cancel conductor 52. The positive pole is also connected through a master cancel switch 53 to a main conductor 54. The negative pole of the battery 51 is connected to a common terminal 55 of a double throw isolation switch 58. The common terminal 55 of the isolation switch 58 is ganged with the master cancel switch 53 so that the two will function simultaneously. A right stationary terminal 57 of the isolation switch 58 is connected to a common terminal 56 of a double throw shift switch 59, and the left stationary terminol 60 of the isolation switch 58 is connected to a shift conductor 61. The shift switch 59 has its right stationary terminal 63 connected to an output conductor 64, and its left stationary terminal 62 connected to the shift conductor 61.

The initial module 48 is comprised of an output device and a shifting device. The output device consists, in the main, of an output relay 65 in the upper half of the module 48, and the shifting device consists largely of a shift relay 66 in the lower half of the module 48. Each of the relays 65 and 66 has normally open contacts, and each has a latching magnet 4 which is positioned to hold its contacts closed after the relay has been energized by a current entering its windings from the end thereof adjacent to the polarity dot 5. The purpose of the output device is to receive information in the form of an input signal, to put out information in the form of an output signal, and to transfer information to the shifting device in the form of a transfer signal. The shifting device receives the transfer information, cancels the information in the output device with a cancel signal, shifts the information to a succeeding module, and has the information cancelled from it by a reset signal.

The output relay 65 has a close-contact winding 67. The end of the close-contact winding 67 adjacent to the polarity dot 5 is connected through a normally open input switch 68 to the input cancel-conductor 52, and the end of a close-contact winding 67 which is remote from the polarity dot 5 is connected to the output conductor 64. The output relay 65 also has an open-contact winding 69. The open-contact winding 69 has one end adjacent to the polarity dot 5, which end is connected to the shift conductor 61 and another end remote from the polarity dot 5 and connected through a normally open cancel switch 70 to the input-cannel conductor 52. The close-contact winding 67 and the open-contact windings 69 function alternately to control a contact 71. One side of a contact 71 is connected to the main conductor 54 and the other side is connected upwardly through a blocking diode 72 to an output terminal 73 and downward through a blocking diode 74 to the shift relay 66.

The shift relay 66 also has a close-contact winding 75. The end of a close-contact winding 75 adjacent to the polarity dot 5 is connected through the blocking diode 74 to the contact 71 of the output relay 65. The opposite end of the close-contact winding 75, which is remote from the polarity dot 5, is connected through the shift conductor 61. An open-contact winding 76 of the shift relay 66 has an end adjacent the polarity dot 5 connected directly to the output conductor 64 and an end remote from the polarity dot 5 connected to the intermediate module 49. The windings 75 and 76 function alternately to actuate the contact 77, one side of which is connected to the main conductor 54. The other side of the contact 77 is connected upwardly through a blocking diode 78 to the open-contact winding 69 of the output relay 65, and it is also connected downwardly through a blocking diode 79 to the intermediate module 49.

The intermedite module 49, like the initial module 48, has a pair of relays 80 and 81, functioning respectively as an output device and a shifting device. Each of the relays 80 and 81 has normally open contacts and a latching magnet 4 positioned to hold its contacts in a closed position after the relay has been energized by a unidirectional current passing through one of its windings from an end adjacent to the polarity dot 5. Similarly to the initial module 48, the upper relay 80 in the intermediate module 49 will be called the output relay 80, and the lower relay 81 will be called the shift relay 81. The intermediate module 49 as will appear in the course of the description, is unique in that a chain of intermediate modules 49 of as many as desired may be connected together.

The output relay 80 in the intermediate module 49 has a close-contact winding 82, one end of which is adjacent the polarity dot 5 and is connected through a blocking diode 79 to the contact 77 of the shift relay 66 in the immediately preceding module 48. The end adjacent the polarity dot 5 of the close-contact winding 82 is also connected through a normally open input switch 83 to the input-cancel conductor 52. The end of the close-contact winding 82 which is remote from the polarity dot 5 is connected to the output conductor 64. The output relay 80 also has an open-contact winding 84, which has one end adjacent to polarity dot 5 connected to the shift conductor 61. The opposite end of the open-contact winding 84, which end is remote from the polarity dot 5 is connected through a normally open cancel switch 85 to the input-cancel conductor 52. The two windings 82 and 84 serve to actuate a contact 86, one side of which is connected to the main conductor 54. The other side of the contact 86 is connected upwardly through a blocking diode 87 to the open-contact winding 76 of the shift relay 66 in the previous module 48 and to an output terminal 88. The same side of the contact 86 is also connected downwardly through a blocking diode 89 to the shift relay 81.

The shift relay 81 has a pair of windings, a close-contact winding 90 and an open-contact winding 91. The close-contact winding 90 has one end, which is adjacent to the polarity dot 5 connected through the blocking diode 89 to the contact 86 of the output relay 80. The other end of the close-contact winding 90, which is remote from the polarity dot 5 is connected directly to the shift conductor 61. The open-contact winding 91 has one end, which is adjacent to the polarity dot 5, connected directly to the output conductor 64, and its other end, which is remote from the polarity dot 5, is connected to the succeeding module 50. The two windings 90 and 91 control a contact 92, one side of which is connected to the main conductor 54. The opposite side of the contact 92 is connected upwardly through a blocking diode 93 to the open-contact winding 84 of the output relay 81, and downwardly through a blocking diode 94 to a succeeding module, which could be another intermediate module 49 (not shown) or the terminal module 50 as in the drawing.

The terminal module 50, unlike the initial module 48 and the intermediate module 49, has only one relay 95, which functions as, and hence will be termed, an output relay 95. The output relay 95 has a close-contact winding 96, one end of which is adjacent the polarity dot 5 and is connected through the blocking diode 94 to the contact 92 of the shift relay 81 in the preceding module 49. The end of the close-contact winding 96 which is adjacent the polarity dot 5 is also connected through a normally open input switch 97 to the input-cancel conductor 52. The end of the close-contact winding 96 which is remote from the polarity dot 5 is connected to the output conductor 64. The output relay 95 also has an open-contact winding 98, one end of which is adjacent the polarity dot 5 and is connected to the shift conductor 61. The other end of the open-contact winding 98 is remote from the polarity dot 5 and is connected both to the main conductor 54 and, through a normally open-cancel switch 99, to the input-cancel conductor 52. The two windings 96 and 98 close and open a contact 100, one side of which is connected directly to the main conductor 54. The opposite side of the contact 100 is connected through a blocking diode 101 to an output terminal 102 and to the open-contact winding 91 of the shift relay 81 of preceding module 49.

The embodiment just described is capable of receiving, advancing and discharging information in several different ways. The description of its operation will cover in detail the serial to serial receiving, advancing and discharging of information, and with that as background, the other variations may be briefly described thereafter. The initial condition of the various components of the shift register is shown in FIG. 2. To insert information into the shift register, the input switch 68 of the initial module 48 may be temporarily closed. Current will then flow from the positive pole of the battery 51 through the input-cancel conductor 52, the input switch 68 and into the end of the close-contact winding 67 adjacent the polarity dot 5, and passing through the winding 67, the shift switch 59 and the isolation switch 58 back to the negative pole of the battery 51. That current, passing through the close-contact winding 67 in the direction indicated will energize the output relay 65 to close the contact 71. The shift register with information in the output relay 65 of the initial module 48 is now in a stable condition.

When the common terminal 56 of the shift switch 59 is moved to the left stationary terminal 62, the current will flow from the positive pole of the battery 51 through the master cancel switch 53, the main conductor 54, the contact 71, and the blocking diode 74, to enter the close-contact winding 75 of the shift relay 66 from the end adjacent the polarity dot 5, and through the close-contact winding 75, the shift conductor 61, the shift switch 59, the isolation switch 58 to the negative pole of the battery 49. The effect of current of that polarity in the close-contact winding 75 will be to close the contact 77 of the shift relay 66. Current will now flow from the main conductor 54 through the contact 77 and upwardly through the blocking diode 78 to enter the open-contact winding 69 of the output relay 65 at its end remote from the polarity dot 5, and through the open-contact winding 69, the shift conductor 61 to the negative pole of the battery 51. The current thus passing through the open-contact winding 69 provides a cancel signal to the output relay by setting up a magnetic field in opposition to that of the latching magnet 4 to overcome the field of the latching magnet 4 and permit the contact 71 to open. The shift register, with information in the shift relay 66 and cancelled from the output relay 65 is in a stable state.

To shift the information to the intermediate module 49, the common terminal 56 of the shift switch 59 must be moved to the right stationary terminal 63. Now current may flow from the positive pole of the battery 51 through the master cancel switch 53, the main conductor 54, the contact 77, the blocking diode 79, and through the close-contact winding 82 of the output relay 80 from the end adjacent to the polarity dot 5, and on through the output conductor 64, the shift switch 59, the isolation switch 58 to the negative pole of the battery 51. Current of that polarity in the close-contact winding 82 of the output relay 80 closes the contact 86, which is then held in its closed position by the latching magnet 4. Current now flows from the main conductor 54 through the contact 86, the blocking diode 87 and the open-contact windings 76 of the shift relay 66 of the initial module 48, entering from the end of the winding 76 remote from the polarity dot 5, to pass through the winding 76 and the output conductor 64, the shift switch 59, the isolation switch 58 to the negative pole of the battery 51. That current provides a reset signal to the shift relay 66 by setting up about the open-contact winding 76 a magnetic field cancelling the field of the latching magnet 4 to permit the contact 77 to open. The information has now been transferred from the initial module 48 to the intermediate 49 and the initial module 48 has been reset to its normal condition.

To advance the information further through the shift register, the common terminal 56 of the shift switch 59 must be moved back to the left stationary terminal 62, so that current may flow from the positive pole of the battery 51 through the master cancel switch 53, the main conductor 54, the contact 86, and downwardly through the blocking diode 89 to enter the end of the close-contact winding 90 of the shift relay 81 adjacent the polarity dot 5. From there the current passes through the winding 90, the shift conductor 61, the shift switch 59, the isolation switch 58 to the negative pole of the battery 51. That current, entering from the polarity dot end of the close-contact winding 90 sets up a magnetic field which closes the contact 92 in the shift relay 81. Current, constituting a cancel signal, may now pass from the main conductor 54 through the contact 92, the open-contact winding 84 of the output relay 80, the shift conductor 61 and thence to the negative pole of the battery 51, entering the open-contact winding 84 from the end remote from the polarity dot 5. Hence, the contact 86 is permitted to open. The information is now stored in the shift relay 81 and has been cleared from the output relay 80.

To advance the information to the terminal module 50, the common terminal 56 of the shift switch 59 must be moved into contact with the right stationary contact 63. Current will then flow from the positive pole of the battery 51 through the master cancel switch 53, the main conductor 54, the contact 92, and thence downwardly through the blocking diode 94, the close-contact winding 96 of the relay 95 in the terminal module 50, the output conductor 64, the shift switch 59, the isolation switch 58 and finally back to the negative pole of the battery 51. Since the current thus enters the close-contact winding 96 from the end adjacent to polarity dot 5, it will have the effect of closing the contact 100. Hence current may now flow from the main conductor 54 through the contact 100, the blocking diode 101, to both the output terminal 102, and the open-contact winding 91 of the shift relay 81 in the intermediate module 49. The current flows into the open-contact winding 91 at the end remote from the polarity dot 5 and out to the output conductor 64 and the negative pole of the battery 51, to function as a reset signal permitting the contact 92 to open. The information is now in the terminal module 50 and has been cleared from the intermediate module 49.

To clear the shift register of the information, the common terminal 56 of the shift switch 59 must be moved back to the left stationary contact 62 so that current may flow from the positive pole of the battery 51 to the maser cancel switch 53, the main conductor 54, the open-contact winding 98 of the output relay 95, the shift conductor 61, the shift switch 59, the isolating switch 58 and back to the negative pole of the battery 51. That current passes through the open-contact winding 98 in such a direction as to create a magnetic field, cancelling that of the latching magnet 4 and permitting the contact 100 to open.

The skin register shown in FIG. 2 is also capable of transferring information in other ways. For example, information may be transferred serially to parallel by reading out the information from any one or more of the output terminals 73, 88, or 102. To transfer information parallel to the serial, it is only necessary to close one or more of the input switches 68, 83 or 97 and then permit the information thus introduced to pass through the shift register in the manner described above. To transfer information parallel to parallel, the information may be introduced into the shift by closing one or more of the input switches 68, 83 and 97 and reading the information out through one or more of the output terminals 73, 88 or 102. It is manifest that the intermediate module 49 may be eliminated and the initial module 48 corrected to the terminal module 50 in the same manner as the initial module 48 was connected to the intermediate module 49, although such a two module shift register would actually be a flip-flop.

Also, the shift register may be increased to any number of module by inserting one or more intermediate modules 49 between the intermediate module 49 and the terminal module 50 in the drawing at the break line, or between the initial module 48 and the intermediate module 49. Although the embodiment shown is a shift register having a beginning and en end, it may be readily converted into a ring shift register by eliminating the initial module 48 and the terminal module 50, and adding, if desired, additional intermediate modules 49, and finally by connecting the shift relay 81 of each preceding intermediate module 49 to the output relay 80 of each suceeding module 49 in the same manner as the initial module 48 is connected to the intermediate module 49, or as the intermediate module 49 is shown to be connected to the terminal module 50 in the drawing.

In the embodiment shown, the information in any one of the modules may be cancelled, without affecting the status of the information in the other modules. This is accomplished by opening the master cancel switch 53 which will also move the common terminal 55 of the isolation switch 58 into contact with the left stationary contact 58. That operation of those two switches 53 and 58 serves to isolate the contact 71, 77 and 86, 92 and 100 from the positive pole of the source of the battery 51, and to connect the negative pole of the battery 51 to the open-contact windings 69, 84, 98 of the output relay 63, 80 and 95. Then one need only close the cancel switch 70, 85, or 99 of the module where the undesired information is to be cancelled. Current will flow through the selected cancel switch 70, 85 or 99 and its associated open-contact winding to permit the contact to open, thus cancelling the information in the module. The ganged master cancel switch 53 and the isolation switch 58 serve to prevent the formation of undesired current paths which could prevent cancellation in some circumstances.

It will also be apparent to one skilled in the art that certain substitutions may be made in the elements shown in the drawing without avoiding the essence of the invention. For example, the cancel signal or the input signal or both could, and in many applications would be received fro man external source of appropirate signal polarity in amplitude. In such an application, the cancel input conductor could be eliminated, as could the switches 68, 70, 83, 85 and 97, and 99. Also any common flip flop could be substituted for one of the output relays, 83, 80 and 95. Also, differenct types of relays and latching mechanisms could be on those specifically described. Many other modifications could also be made without departing from the essence of the invention.

THIRD EMBODIMENT

The third embodiment of the present invention is illustrated in FIG. 3 of the drawings, and it is characterized by its use of relays with normally closed contacts as distinguished from the relays with normally open contacts in the other embodiments. The achievement of that essential characteristic while embodying the present invention involves the novel circuitry to be described, and is based broadly upon the idea of providing shunt paths around the relay winds, etc., through the normally closed contacts, which shunt paths can thus be interrupted by opening the contacts.

As in the previously described embodiments, the third embodiment shown in FIG. 3 illustrates a shift register having only three modules, an initial module 103, an intermediate module 104 and a terminal module 105. The three modules 103, 104 and 105 are set off from one another by horizontal, broken lines, and between the intermediate module 104 and the terminal module 105 in the drawing, break lines interrupt the conductors to indicate that any number of additional intermediate modules 104 could be inserted in the circuit to achieve a shift register of any desired length. The initial module 103 and the intermediate module 104, each have an output device and a shifting device, but the terminal module 105 has only an output device. The output devices are designed to receive an input signal, either from a preceding module or an external source, to present an output signal, if desired, to transmit a transfer signal to the shifting device, and to provide a reset signal to clear the information from a preceding module. The shifting device is energized by a transfer signal from the output device to cancel the information from the output device with a cancel signal and shift the information to a succeeding module with a shift signal. The shift device is reset by a reset signal from the suceeding module.

Central to the circuitry which is common to the entire shift register is a source of unidirectional current in the form of a battery 106, which has its negative pole connected to a return conductor 107 and its positive pole connected to a shift switch 108. The shift switch 108 is a double throw switch with a common terminal 109 connected to the positive pole of the battery 106, a right stationary terminal 110 connected to an output conductor 111, and a left stationary terminal 112 connected to a shift conductor 113.

The initial module 103 consists of an output device and a shifting device in the form of two relays, 114 and 115. Each of the relays 114 and 115 has two windings, two contacts that are normally closed and a latching magnet 116 which will hold the contacts open upon energization of the winding by passing current through them entering from the ends adjacent polarity dots 117. Such a current as applied to an output device will be referred to as an input signal, and as applied to a shifting device, a transfer signal. When the contacts are latched open, they may be closed again by passing current through the windings, entering from the ends remote from the polarity dots 117. That current, when applied to an output device will be called a chancel signal, and when applied to a shifting device, a reset signal. The output device is made up primarily of the upper relay 114 in the drawing, which will be referred to as the output relay 114. The lower relay 115 is the major component of the shift device and will be referred to as a shift relay 115.

The output relay 114 has an open-contact winding 118 which is connected, at its end adjacent the polarity dots 117, through a normally open input switch 119 to the positive pole of the battery 106, and its end remote from the polarity dot 117 is connected to the return conductor 107. The other winding of the output relay 114 is a close-contact winding 120, and it has its end adjacent the polarity dot 117 connected to the return conductor 107 and its end remote from the polarity dot 117 connected to a common terminal 121 of a double throw cancel switch 122. The cancel switch 122 has an upper stationary contact 123 connected through a current limiting resistor 124 to the output conductor 111, and a lower stationary contact 125 connected to the shift relay 115. Of the pair of contacts, one is an output contact 126 which has one side connected to an output terminal 128 and to the output conductor 111 through the current limiting resistor 124, and an opposite side connected to the return conductor 107. The other contact is a transfer contact 127 which has one side connected through a current limiting resistor 129 to the shift conductor 113, and its other side connected to the shift relay 115.

The shift relay 115 has an open-contact winding 130, which has one end adjacent a polarity dot 117 connected through the current limiting resistor 129 to the shift conductor 113 and another end remote from the polarity dot 117 connected to the return conductor 107. The shift relay 115 also has a close-contact winding 131 which has one end adjacent a polarity dot 117 connected to the return conductor 107 and another end, which is remote from the polarity dot 117, connected to the intermediate module 104. Finally, the shift relay 115 has a pair of contacts, one of which is a cancel contact 132 which has one side which is connected to the lower stationary contact 125 of the cancel switch 122 and which is connected through a current limiting resistor 134 to the shift conductor 113. The other side of the cancel contact 132 is connected to the return conductor 107. The other contact is a shift contact 133 which has one side connected to the intermediate module 104 and the other side connected to the return conductor 107.

The intermediate module 104 like the initial module 103, consists generally of an output device and a shifting device connected serially. The central component of the output device is an output relay 135 just as a shift relay 136 is central to the shifting device. The output relay 135 has an open-contact winding 137, one end of which is adjacent a polarity dot 117 and is connected through an input switch 138 to the transfer contact 133 of the shift relay 115 of the previous module 103. The same end of the open-contact winding 137 is also connected through a current limiting resistor 139 to the output conductor 111. The opposite end of the open-contact winding 137, the end remote from the polarity dot 117, is connected to the return conductor 107. The other winding in the output relay 135 is a close-contact winding 140 which has an end adjacent a polarity dot 117 connected to the return conductor 107, and an opposite end remote from the polarity dot 117 connected to a common terminal 141 of the cancel switch 142. The cancel switch 142 has an upper stationay terminal 143 which is connected through a current limiting resistor 144 to the output conductor 111, and a lower stationary terminal 145 which is connected to the shift relay 136.

The relay windings 137 and 140 operate a pair of contacts, one of which is an output contact 146. The output contact 146 is connected between the return conductor 107, on one side, and an output terminal 148 and the output conductor 111, through a current limiting resistor 144 on the other side. The other contact is a transfer contact 147 which has one side connected to the return conductor 107 and which has another side connected to the shift conductor 113 through the current limiting resistor 149 and to the shift relay 136.

The shift relay 136 has an open-contact winding 150, the polarity dot end of which is connected both to the transfer contact 147 of the output relay 135 and to the shift conductor 113 through the resistor 149. The other end of the open-contact winding 115 is remote from the polarity dot 117 and is connected to the return conductor 107. The shift relay 136 also has a close-contact winding 151 which has an end adjacent a polarity dot 117 connected to the return conductor 107 and an end remote from the polarity dot 117 connected to a succeeding module, the terminal module 105. The shift relay 136 also has a pair of contacts, one of which is a cancel contact 152, which is connected between the lower stationary terminal 145 of the cancel switch 142 and through a current limiting resistor 154 to the shift conductor 113 on one side and the return conductor 107 on its other side. The other contact is a shift contact 153 which is connected between the succeeding module 105 on one side, and the return conductor 107 on the other side.

The terminal module 105 has only an output device, central to which is an output relay 155. The output relay 155 has an open-contact winding 156, with one end adjacent the polarity dot 117 connected through an input switch 157 to the intermediate module 104, and through a current limiting resistor 158 to the output conductor 111. The other end of the open-contact winding 156 remote from the polarity dot 117 is connected to the return conductor 107. The other winding in the output relay 155 is a close-contact winding 159 which has an end adjacent a polarity dot 117 connected to the return conductor 107, and an end remote from the polarity dot 117 is connected through a normally closed cancel switch 160 and a current limiting resistor 161 to the shift conductor 113. The output relay 155 has only a single contact, an output contact 162, which is connected between the output terminal 163, the preceding module 104, and, through a current limiting resistor 164, to the output conductor 111 on one side, and the return conductor 107 on the other side.

The operation of the third embodiment is best described by treating first of the serial in and serial out flow of information and subsequently treating the other modes of operations as variations thereto. The initial condition of the shift register for the purposes of this description is as shown in FIG. 3. Information, in the form of an input signal, may be fed into the initial module 103 by closing the input switch 119, so that current may flow from the positive pole of the battery 106, through the input switch 119 and the open-contact winding 118, entering from the end adjacent to the polarity dot 117, and back through the return conductor 107 to the negative pole of the battery 106. That current, or input signal, energizes the relay 114, opening the contacts 126 and 127, which will then be held open by the latching magnet 116, interrupting two shunt paths. When the shunt path through the contact 126 is interrupted, an output signal may be taken from the output terminal 128.

To transfer the information to the shifting device, the common terminal 109 of the shift switch 108 must be moved into contact with the left stationary contact 112, so that current may flow from the positive pole of the battery 106 through the shift switch 108, the shift conductor 113, and the current limiting resistor 129. Since the shunt path through the transfer contact 127 in the output relay is opened and the shunt path this interrupted, the current from the resistor 129 will flow through the open-contact winding 130 of the shift relay 115, which it enters from the end adjacent polarity dot 117, and, through the return conductor 107, back to the negative pole of the battery 106. This current, which serves as a transfer signal to transfer the information to the shifting device, opens the contacts 132 and 133. When the contact 133 opens, interrupting the shunt path to the return conductor 107, the current from the current limiting resistor 134 is diverted through the cancel switch 121, and the close-contact winding 120 which it enters from the end remote from the polarity dot 117, and from there, through the return conductor 107 to the negative pole of the battery 106. This current, serving as a cancel signal, induces an electromagnetic field in the output relay 114 which cancels the magnetic field of the latching magnet 116 permitting the contacts 126 and 127 to return to their normal, closed position.

Nothing further will happed until the common terminal 109 of the shift switch 108 is moved back into contact with the right stationary terminal 110. When that is done, a shift signal in the form of a current flowing from the positive pole of the battery 106 to the shift switch 108, the output conductor 111 and the current limiting resistor 139, will pass through the open-contact winding 137 of the output relay 135 in the intermediate module 104, entering the winding 137 from the end adjacent the polarity dot 117, and flowing back through the return conductor 107 to the negative pole of the battery 106. Hence, the shift signal from the initial module 103, serving as an input signal to the intermediate module 104, will open the contacts 146 and 147 of the output relay 135, presenting an output signal at the terminal 148 if it is desired to read out information in a parallel direction, and setting the stage for the next step.

Now the common terminal 109 of the shift switch 108 may be moved back to the left stationary terminal 112, so that a transfer signal, in the form of a current flowing from the positive pole of the battery, will pass through the shift switch 108 and the shift conductor 113, through the current limiting resistor 149 and thence through the open-contact winding 115 of the transfer relay 136 of the intermediate module 104, which it enters from the end of the winding 115 adjacent to the polarity dot 117, and passes out to the return conductor 107 back to the negative pole of the battery 106. This transfer signal transfers the information from the output device to the shifting device by opening the contacts 152 and 153 so that the shunt path through the contact 152 is interrupted, to permit current to flow from the shift conductor 113 to the cancel switch 142 and the close-contact winding 140 of the output relay 134, which it enters from the end remote from the polarity dot 117, and leaves through the return conductor 107 to the negative pole of the battery 106. That current serves as a cancel signal by effecting the closure of the contacts 146 and 147. The information is now in the shift relay 136 of the intermediate module 104, and all of the previous relays have been cleared and are ready for further use when desired.

The information may now be transferred to the terminal module 105 by a shift signal from the shifting device of the intermediate module 104, input signal to the terminal module 105. Such a shift signal is created by moving the common terminal 109 of the shift switch 108 to the right stationary contact 110, so that current flowing from the positive pole of the battery 106 through the shift switch 108 will pass through the output conductor 111 and the current limiting resistor 158 and, finding the contact 153 open, down through the open-contact winding 156 of the output relay 155 entering from the end adjacent the polarity dot 117, and passing out to the return conductor 107 to the negative pole of the battery 106. The contact 162 is opened by that current, interrupting a shunt circuit for current passing from the output conductor 111 through the current limiting resistor 164, so that that current, serving as a reset signal, is now diverted to the output terminal 163 and up through the close-contact winding 151 of the shift relay 136 of the intermediate module 104, to the return conductor 107 and hence to the negative pole of the battery 106. The reset signal permits the contacts 152 and 153 to close so that the information is now in the terminal module, and the intermediate module 104 has been cleared.

The terminal module may be cleared by moving the common terminal 109 of the shift switch 108 to the left stationary contact 112 so that current will pass from the positive pole of the battery 106 through the shift switch 108 to the shift conductor 113. The current flowing in the shift conductor 113 will find a path through the current limiting resistor 161, the normally closed cancel switch 160, the close-contact winding 159 of the output relay 155, and back to the negative pole of the battery 106, through the return conductor 107. This current, constituting a cancel signal in the close-contact winding 159 will generate a magnetic field overcoming the field of the latching magnet 116 and permitting the contact 162 to close.

As has been indicated, the information in the shift register may be read out parallel from any one of the output terminals 128, 148 or 163 when the corresponding output relay 114, 135 or 155 is energized and the common terminal 109 of the shift switch 108 contacts the right stationary terminal 110. If it is desired to read the information in parallel, the common terminal 109 of the shift switch 108 again should be in contact with the right stationary terminal 110 so that current will pass through the output conductor 111. When the shift register is in that position, the appropriate input switch 138 or 157 may be opened, interrupting the shunt circuit through the relay contacts of the preceding module and permitting current to pass through the open-contact windings 137 or 156 of the corresponding output relay 135 or 155 to energize those relays.

Information in any one of the modules may be cancelled by again moving the common terminal 109 of the shift switch 108 to the right stationary terminal 110. The module 103, 104 or 105 having information, will have its output relay 114, 135 or 155 energized so that the contacts 126, 146 or 162 will be opened. The common terminal 121 or 141 of the corresponding cancelled switches 142 or 122 may then be moved into contact with the upper stationary terminal 123 or 143, permitting current to flow from the output conductor 111 through the appropriate close-contact winding, restoring the contact to the normally closed position. In the embodiment shown, the cancel switch 160 in the terminal module 105 is normally closed, and as a result the terminal module 105 receives a cancelling impulse each time the common terminal 109 of the shift switch 108 contacts the left stationary terminal 112. This situation may be avoided, where desired, by opening the cancel switch 160, preserving the condition of the output relay 155 of the terminal module 105.

It will be apparent from the foregoing that if it is desired to make a ring shift register, this may be accomplished by eliminating the terminal module 105 in the initial module 103 and connecting the output of the intermediate module 104 to the input of the intermediate module 104 in the manner in which the initial module 103 is connected to the intermediate module 104, or the intermediate module 104 is connected to the terminal module 105. A ring shift register having only one module, while possible, would have limited utility, but more intermediate modules may be inserted by connecting them together in the manner in which the intermediate module 104 in FIG. 3 is connected to the initial module 103 and the terminal module 105.

As in the previous embodiments, numerous variations of the present embodiment will be apparent to those skilled in the art which will not depart from the present invention. For example, the output device shown in the drawing is a relay, but it may also be a flip-flop of any one of many known as well as unknown varieties. Different types of relays can be used from those described above. Ground returns may be substituted for some of the conductors shown. A battery 106 is shown as a source of unidirectional current but clearly any other source of unidirectional current would work as well. Also, other sources of input signal or cancel of appropriate polarity and amplitude might be used.

FOURTH EMBODIMENT

The fourth embodiment of the present invention is illustrated in FIG. 4 of the drawing, and is characterized by its operation from a sequence of signals, which may be either synchronous or asynchronous, depending upon the source of the signals. Like the first, second and third embodiments described above, the fourth embodiment is illustrated in the form of a shift register with three modules, an initial module 165, an intermediate module 166 and a terminal module 167. The modules 165, 166 and 167 are set off from each other by horizontal, broken lines for clarity of illustration. Between the intermediate module 166 and the terminal module 167 the conductors are interrupted by break lines, which are also set off between a pair of horizontal broken lines, to illustrate that any number of additional intermediate modules 166 could be added in the same manner as is the one intermediate module 166 shown.

The initial module 165 and the intermediate module 166 each have two relays and the terminal module 167 has but one relay. Each of the relays has only one, normally open contact, two windings, and a latching magnet 168 to retain the contact in a closed position after the relay has been energized. Any of the relays may be energized to close its contact by introducing a unidirectional current signal to one or both windings at the ends adjacent the polarity dots 169. After one of the relays has been latched into its closed position, it may be returned to its normal, open condition by passing a unidirectional current signal through one or both windings from their ends remote from the polarity dots 169, provided that the signal is of sufficient magnitude to build up about the relay winding a magnetic field capable of cancelling the field of the latching magnet 168.

A common source of unidirectional current, in the form of a battery 170, is provided for the entire shift register. The negative pole of the battery 170 is connected to a return conductor 171, and the positive pole of the battery 170 is connected to a common terminal 172 of a multi-terminal sequencing switch 173. The sequencing switch 173 is provided with the common terminal 172 so that it may sequentially contact the terminal of four conductors, an output conductor 174, a cancel conductor 175, a shift conductor 176 and a reset conductor 177. All four of the conductors 174, 175, 176 and 177 are connected to each of the initial and intermediate modules 165 and 166, but only the output and cancel conductors 174 and 175 are connected to the terminal module 167. By means of this circuitry, the embodiment provides external reset and cancelling functions, which in the previously described embodiments 1 through 3 were internally provided by each succeeding relay for its immediately preceding relay. It is manifest that any pulse generator or source of sequential pulses may be substituted for the sequencing switch 173, which, along with the battery 170, is intended only as a diagrammatic definition of the sort of signal source required.

The initial module 165 has an output device consisting, in the main, of an output relay 178. The output relay 178 has a single, normally open contact 179, a close-contact winding 180 and an open-contact winding 181. A polarity dot 169 is adjacent one end of the close-contact winding 180 and that end is connected through an input switch 182 to the output conductor 174. Another end remote from the polarity dot 169 is connected to the return conductor 171. The open-contact winding 181 also has a polarity dot 169 adjacent one end which is connected to the return conductor 171. The opposite end of the open-contact winding 181, which is remote from the polarity dot 169, is connected to the cancel conductor 175. One side of the normally open contact 179 is connected to the output conductor 174 and the other side is connected to an output terminal 183 and a shift relay 184.

Like the output relay 178, the shift relay 184 has a normally open contact 185, a close-contact winding 186, and an open-contact winding 187. The close-contact winding 186 has one end, which has the polarity dot 169 adjacent to it, and connected through the contact 179 with the output relay 178 to the output conductor 174, and an opposite end remote from the polarity dot 169 connected to the return conductor 171. The open-contact winding 187 has its end adjacent to the polarity dot 169 connected to the return conductor 171 and its opposite end, remote from the polarity dot 169, connected to the reset conductor 177. The contact 185 is connected between the shift conductor 176 and the intermediate module 166.

The intermediate module 166, like the initial module 165, has an output device comprised of an output relay 188. The output relay 188 has a normally open contact 189, a close-contact winding 190 and an open-contact winding 191. The close-contact winding 190 has its end adjacent to the polarity dot 169 connected to the output conductor 174 through a normally open input switch 192 and the shift conductor 176 through the contact 185 of the shift relay 184 in the intermediate module 165. The opposite end of the close-contact winding 190, that is, the end remote from the polarity dot 169, is connected to the return conductor 171. By contrast, the polarity dot end of the open-contact winding 191 is connected to the return conductor 171 and the end of the open-contact winding 191 remote from the polarity dot 169 is connected to the cancel conductor 175. The normally open contact 189 is connected between the output conductor 174 on one side, and the output terminal 193 and the shift relay 194 on the other side.

The shift relay 194, is of the same type as the previously described relays, having a normally open contact 195, a close-contact winding 196 and an open-contact winding 197. The polarity dot end of the close-contact winding 196 is connected through the contact 189 of the output relay 188 to the output conductor 174, and the opposite end of the close-contact winding 196 is connected to the return conductor 171. The open-contact winding 197 has its end adjacent to the polarity dot 169 connected to the return conductor 171, and its end remote from the polarity dot 169 connected to the reset conductor 177. The contact 195 is connected between the shift conductor 176 and the next module, which is the terminal module 167.

The terminal module 167 has only a single relay, the output relay 198, which is made up of a normally open contact 199, a close-contact winding 200 and an open-contact winding 201. The polarity dot end of the close-contact winding 200 is connected through the contact 195 of the shift relay 194 in the preceding module 196 to the shift conductor 176, and the polarity dot end of the winding 200 is also connected through an input switch 202 to the output conductor 174. The end of the close-contact winding 200 which is remote from the polarity dot 169 is connected to the return conductor 171. The open-contact winding 201, on the other hand, has its end adjacent to a polarity dot 169 connected to the return conductor 171, and its end remote from the polarity dot 169 connected to the cancel conductor 175. The contact 199 of the output relay 198 is connected between the output conductor 174 and an output terminal 203.

In operation of the fourth embodiment of the present invention, the initial condition is that shown in the drawing. Information is fed into the shift register by closing the input switch 182, which causes current to flow from the positive pole of the battery 170 through the sequencing switch 173 and the output conductor 174, through the input switch 182 to enter the close-contact winding 180 from its polarity dot end and passing out of the close-contact winding 180 back to the negative pole of the battery 170 through the return conductor 171. This current, serving as an input signal, closes the contact 179, which will be latched in that position by the magnet 168. With the contact 179 closed, the current will flow from the output conductor 174 through the contact 179, to the output terminal 183, and through the closed contact winding 186 of the shift relay 184, to the return conductor 171 and the negative pole of the battery 170. Since this current enters the close-contact winding 186 from its end adjacent the polarity dot 169, the relay 184 is energized and the contact 185 is closed and latched shut.

To initiate the next step in the operation of the shift register, the common terminal 172 of the sequence switch 173 is moved to contact the cancel conductor 175, so that a current path is created from the positive pole of the battery 170, through the sequencing switch 173, the cancel conductor 175, the open-contcat winding 181 of the output relay 178, and through the return conductor 171 back to the negative pole of the battery 170. This current, entering the open-contact winding 181 from its end remote from the polarity dot, serves as a cancel signal, setting up an electromagnetic field opposing that of the latching magnet 168, permitting the contact 179 to return to its normal, open conditions. The information is now stored in the shift relay 184 and cleared from the output relay 178.

Next, the common terminals 172 of the sequence switch 173 is moved to the shift conductor 176 to establish a current path from the positive pole of the battery 170 through the sequencing switch 173, the shift conductor 176, the contacts 185 and the close-contact winding 190 of the output relay 188 of the intermediate module 166, entering the winding 190 from the end adjacent the polarity dot 169, and returning through the return conductor 171 to the negative pole of the battery 170. A current flowing through that path acts as a shift signal from the shift relay 184 and an input signal to the output relay 188 closing the contact 189. Finally the common terminal 172 of the sequencing switch 173 is moved to the reset conductor 177, and a reset signal is transmitted from the positive pole of the battery through the sequencing switch 173, the reset conductor 177, the open-contact winding 187 of the shift relay 184 in the initial module 185 to the return conductor 171 in the negative pole of the battery 170. Since the current entered the open-contact winding 187 from the end remote from the polarity dot 169, the open-contact winding 187 of the shift relay 184 in the initial module 165 is returned to its normal open.

The common terminal 172 of the sequencing switch 173 is now moved back to the output conductor 174 to begin again the sequence of signals to the shift register. The current flows from the positive pole of the battery 170 through the sequencing switch 173, the output conductor 174, the closed contact 189, to the output terminal 193 and through the close-contact winding 196 of the shift relay 194, returning to the negative pole of the battery 170 via the return conductor 171. This current provides an output and a transfer signal since the magnetic field induced by this current energizes the shift relay 194 to close the contact 195 and puts a signal on the output terminal 193.

Next, the common terminal 172 of the sequencing switch 173 is moved to the cancel conductor 175 so that current can flow from the positive pole of the battery, through the sequencing switch 173, the cancel conductor 175, the open-contact winding 191 of the output relay 188, and back through the return conductor 171 to the negative pole of the battery 170. That current acts as a cancel signal, opening the contact 189 in the output relay 188. The information is now cleared from the output relay 188 and stored in the shift relay 194.

To shift the information the common terminal 172, the sequencing switch 173 is moved to the shift conductor 176. A shift signal in the form of a current flows from the positive pole of the battery 170, through the sequencing switch 173, the shift conductor 176, the contacts 195, the close-contact winding 200 of the output field 198 of the terminal module 167, the return conductor 171 and back to the negative pole of the battery 170. The contact 199 is closed thereby and the information is shifted into the terminal module 167.

Finally, the intermediate module is cleared of the information by moving the common terminal 172 of the sequencing switch 173 to the reset conductor 177. That permits a reset signal to be transmitted from the positive pole of the battery 170 through the sequencing switch 173, the reset conductor 177, the open-contact winding 197 of the shift relay 194 in the intermediate module 166 and back through the return conductor 171 to the negative pole of the battery 170. Hence, the contact 195 is opened and the information has now been cleared from the intermediate module 166 and lies in the terminal module 167.

The sequencing switch 173 once again begins its course, by moving the common terminal 172 into contact with the output conductor 174 so an output signal flows from the positive pole of the battery 170 through the sequencing switch 173, the output conductor 174, the contact 199 and to the output terminal 203. To clear the terminal module 167 and thus the entire shift register of the information, the common terminal 172 of the sequencing switch is moved to the cancel conductor 175, so that a cancel signal flows from the positive pole of the battery 170 through the sequencing switch 173, the open contact winding 201 of the output relay 198, and back to the negative pole of the battery 170 through the return conductor 171. This signal, entering the open-contact winding 201 from its end remote from the polarity dot 169 will open the contact 199 and the shift register is returned to its initial condition.

The information may be fed into the shift register in parallel instead of in serial by closing the input switch 192 or 202 when the common terminal 172 of the sequencing switch 173 is in contact with the output conductor 174. The information may be read out of the shift register in parallel as indicated above from any one of the output terminals 183, 193 or 203 at the appropriate times indicated. The shift register of the fourth embodiment may be converted into a ring shift register by eliminating the terminal module 167 and connecting the contact 195 of the shift relay 194 in the intermediate module 166 to polarity dot end of the close-contact winding 180 of the initial module 165. Once again, the possible variations in the fourth embodiment which may be made by one skilled in the art without departing from the invention are substantially the same as those discussed in connection with the previous embodiments except insofar as the fourth embodiment differs from those that preceded it.

FIFTH EMBODIMENT

The fifth embodiment of the present invention is diagrammed in FIG. 5, and is characterized by its ability to transfer information in four directions, simultaneously or individually, as distinguished from the unidirectional embodiments described above. This embodiment is achieved by means of certain modifications of the first embodiment. In the first embodiment, the modules 1 and 2 are comprised of two relays each, and each relay had two windings, two contacts and a latching magnet, for transferring information in one direction. In the present embodiment, each module has two relays, each with two windings and each with one contact, in addition to the original two, for each direction, in addition to one, in which information is transferred.

The fifth embodiment, as diagrammed in FIG. 5, has six modules, a center module 205, in the center of the drawing, a right intermediate module 206 to the immediate right of center module 205, a right end module 207 which is to the right of the right intermediate module 206, a lower module 208, which is just beneath the center module 205, a left module 209, which is to the left of the center module 205, and an upper module 210 which is just above the center module 205. The fifth embodiment has neither initial module nor a terminal module as was shown in the previous embodiments, since information may be fed into any one of the modules and caused to circulate continuously through all the modules. Although only six modules are shown, it will be apparent that any number of intermediate modules may be inserted in series with the center module 205, in the same manner as the right intermediate module 206 is connected up. It will also be apparent that additional intermediate modules having the same capabilities as the center module 205 may also be added each with other intermediate modules connected to its according to the teachings of the following description.

Each of the six modules 205, 206, 207, 208, 209, 210 has an output device and a shifting device, both devices being made up, in the main, of identical relays. Each relay has two or more, normally open contacts, depending upon the number of directions in which it is to transfer information. Each relay has two windings, and a latching magnet 211 to hold the contacts in the closed position after the relay has been energized by passing a unidirectional current through one or both of its windings, entering from the end or ends adjacent the polarity dots 212. Also, in the relays which transfer information in more than one direction, an isolating diode is connected in series with the winding for each direction in which information is transferred to define the desired current path for the signals.

Although the fifth embodiment shows the use of the first embodiment as a basic shift register element, any of the other three embodiments may also be modified in a similar manner to create a multi-directional shift register. Also, the embodiment illustrated in FIG. 5 can shift information in only four directions, but that number of directions was chosen only for convenience of illustration and it will be apparent according to this disclosure that by applying the very same teachings, the shift register capable of handling information in any number of different directions may be made by merely adding or subtracting the appropriate number of contacts and diodes in each relay as is indicated in the present embodiment. As in the first, second and third embodiments, the fifth embodiment also provides an internal reset, that is to say, the transfer of information to a succeeding module automatically cancels that information from all preceding modules. Also, the fifth embodiment illustrates that an output signal may be taken from any contact on the output relay or a separate contact may be established for that purpose, whichever arrangement is desired.

A source of unidirectional current common to the entire shift register is provided in the battery 213 which has its negative pole grounded. The positive pole of the battery 213 is connected directly to an input-cancel conductor 214 and to the common terminal 215 of a double throw shift switch 216. The shift switch 216 has a right stationary terminal 217 which is connected to a shift conductor 218 and a left stationary terminal 219 which is connected to a set of direction controls. The direction controls in this embodiment consist of a series of switches. The leftmost switch is the left control switch 220 and it is connected to a left control signal conductor 221. Second from the left in the drawing is a down control switch 222 which is connected to a down control signal conductor 223. Second from the right in the drawing is an up control switch 224 which is connected to an up control signal 225. A right control switch 226 is the rightmost switch shown in the drawing and it is connected to a right control signal conductor 227.

The center module 205 has an output device and a shifting device. The output device is comprised of an output relay 228 which has a close-contact winding 229, an open-contact winding 230, and five normally open contacts. Of the five contacts, beginning from the left, the first is a transfer contact 231, next is an output and reset right contact 232, then a reset up contact 233, and second from the right is a rest down contact 234 and the last one on the right is a reset left contact 235. The close-contact winding 229 has an end adjacent to a polarity dot 212 which is connected through an input switch 236 to the input-cancel conductor 214, and it is also connected in common to the cathodes of four isolating diodes 237, 238, 239 and 240. The upper isolating diode 237 is connected to the upper terminal module 210. The left isolating diode 238 is connected to the left terminal module 209. The right isolating diode 239 is connected to the right intermediate module 206, and a downward isolating diode 240 is connected to the lower terminal module 208. The end of the closed contact 229 remote from the polarity dot 212 is grounded. The open-contact winding 228 has its end adjacent the polarity dot 212 grounded, and an end remote from the polarity dot 212 both connected through a cancel switch 241 to the input-cancel conductor 214 and connected to the shifting device.

Of the five normally open contacts in the output relay 228, the transfer contact 231 is connected between the shift conductor 218 and the shifting device. The output and reset right contact 232 is connected between the left control signal conductor 221 and the right intermediate module 206, and it is also connected to an output terminal 242. The reset up contact 233 is connected between the down control signal conductor 223 and the upper module 210. The reset down contact 234 is connected between the upper control signal conductor 225 and the lower module 208. Finally, the reset left contact 235 is connected between the right control signal conductor 227 and the left module 209.

The shifting device in the center module 205 is made up of a shift relay 243, which has a close-contact winding 244, an open-contact winding 245, and five normally open contacts. Of the five normally open contacts, from left to right on the drawing, first is a cancel contact 246, next, a shift left contact 247, third from the left is a shift down contact 248, second from the right is a shift up contact 249, and on the right, a shift right contact 250. The close-contact winding 244 has an end adjacent to a polarity dot 212 connected through the transfer contact 231 in the output relay 228 to a shift conductor 218. The end of the close-contact winding 244 which is remote from the polarity dot 212 is grounded. The open-contact winding 245 has its end adjacent the polarity dot 212 grounded, but its end remote from the polarity dot 212 is connected to the cathodes of four diodes, 251, 252, 253, and 254. The open contact winding 245 is connected through the up isolating diode 251 to the upper modules 210, through the left isolating diode 252 to the left module 209, through the right isolating diode 253 to the right intermediate module 206, and through the down isolating diode 254 to the lower module 208.

Of the five normally open contacts, the cancel contact 246 is connected between the shift conductor 218 and the end of the open-contact winding 230 which is remote from the polarity dot 212 in the output relay 228. The shift left contact 247 is connected between the left control signal conductor 221 and the left module 209. The shift down contact 248 is connected between the down control signal conductor and the lower module 208. The shift up contact 249 is connected between the up control signal conductor 225 and the upper module 210. Finally, the shift right contact 250 is connected between the right control signal conductor 227 and the right intermediate module 206.

The function of the output relay 228 and the shift relay 243 can be briefly described before proceeding with the structural description of the remaining module. When a signal is received in the output relay 228, that relay 228 is energized closing all of the contacts. The effect of closing the reset right contact 232, the reset up contact 233, the reset down contact 234 and the reset left contact 235 is to clear automatically the information from all the other modules in the system. The closing of the transfer contact 231 passes the information on to the shift relay 243, and the closing of the output and right reset contact 232 places the information that the output terminal 242. Since the close-contact winding 244 of the shift relay 243 is connected through the transfer contact 231 to the shift conductor 218, by putting a signal on the shift conductor 218, the information is transferred to the shift relay 243, closing its five contacts. The closing of the cancel contact 246 erases the information from the output relay 228 and the closing of the remaining contacts permits a shifting of the information to any one or all of the four directions available in this embodiment.

The right intermediate module 206 consists of an output device and a shifting device. The output device contains an output relay 225 which has a close-contact winding 256 and an open-contact winding 257 which actuate three contacts, a transfer contact 253, a reset right and output contact 259, and a reset left contact 260. The close-contact winding 256 has its end adjacent the polarity dot 212 connected through a normally open input switch 261 to the input-cancel conductor 214. That same end is also connected through a left isolating diode 262, to the right transfer contact 250 of the shift relay 243 in the center module 205, and it is also connected through a right isolating diode 263 to the right end module 207. The end of the close-contact winding 256 which is remote from the polarity dot 212 is grounded. The open-contact winding 257 has its end adjacent the polarity dot 212 grounded, and the end remote from the polarity dot 212 is connected to the shifting device and, through a cancel switch 264, to the input-cancel conductor 214. Of the three contacts, the transfer contact 250 is connected between the shift conductor 218 and the shifting device. The output and reset right contact 259 is connected between the left control signal conductor 221 and the right end module 207, and to an output terminal 265. The reset left contact 260 is connected between the right control signal conductor 227 and the end of the open-contact winding 245 remote from the polarity dot 212 in the shift relay 243 of the center module 205.

The shifting device of the intermediate module 206 contains a shift relay 266. The shift relay 266 has a pair of windings, a close-contact winding 267 and an open-contact winding 268, and three normally open contacts, as follows: a cancel contact 269, a shift left contact 270, and a shift right contact 271. The close-contact winding 267 has its end adjacent the polarity dot 212 connected to the transfer contact 258 in the output relay 255, and its end remote from the polarity dot 212 is grounded. The open-contact winding 268 has its end adjacent the polarity dot 212 grounded, and its end remote from the polarity dot 212 connected through a right isolating diode 272 to the right end module 207, and through a left isolating diode 273 to the reset right contact 232 in the output relay 228 of the center module 205. The cancel contact 269 of the shift relay 266 is connected between the shift conductor 218 and the open contact winding 257 of the output relay 255. The shift left contact 270 is connected between the left control signal conductor 221 and the open contact winding 229 of the output relay 228 of the center module 205, through the right isolating diode 239. The shift right contact 271 is connected between the right control signal conductor 227 and the right end module 207.

Generally speaking, the right intermediate module 206 functions to transfer information between the center module 205 and the right end module 207. This is accomplished by inserting information into the output relay 255 of the right intermediate module 206 so as to energize the relay 255, closing the contacts 258, 259 and 260. This has the effect of transferring the information to the shift relay 266 and clearing the information from either or both the center module 205 or the right end module 207, depending upon the operation of the directional controls described above. From the shift relay 266, the output relay 255 is deenergized, and the information is shifted to either or both the center module 205 or the right end module 207, again depending upon the operation of the directional controls, since all three contacts 269, 270 and 271 will be closed.

The right end module 207, like the previously described modules, has an output device and an input device, and the primary component of the output device is an output relay 274. The output relay 274 has a close-contact winding 275, an open-contact winding 276 and three normally open contacts: a transfer contact 277, an output contact 278 and a reset contact 279. The close-contact winding 275 has its end adjacent the polarity dot 212 connected through an input switch 280 to the input cancel conductor 214 and connected to the transfer right contact 271 of the shift relay 266 of the right intermediate module 206. The end of the close-contact winding 275 which is remote from the polarity dot 212 is grounded. The open-contact winding 276 has its end adjacent the polarity dot 212 grounded and its end remote from the polarity dot 212 is connected through a cancel switch 281 to the input-cancel conductor 214 and connected to a shifting device. The transfer contact 277 is connected between the shift conductor 218 and the shifting device. The output contact 278 is connected between the left control signal conductor 221 and an output terminal 282. Finally, the reset contact 279 is connected between the right control signal conductor 227 and the open contact winding 268 of the shift relay 266 and the right intermediate module 206, through the right isolating diode 272. Hence, the output device of the right end module 206 is adapted to receive information only from the right intermediate module 206, to clear the information from the right intermediate module 206 and to transfer the information to the shifting device in the right end module 207.

The shifting device is made up primarily of a relay, in this case the shift relay 283. The shift relay 283 has a close-contact winding 284, an open-contact winding 285 and two normally open contacts: a cancel contact 286 and a shift contact 287. The close-contact winding 284 has its polarity dot end connected to a transfer contact 277 of the output relay 274. The end of the close-contact winding 284 which is remote from the polarity dot 212 is grounded. The open-contact winding 285 has its end adjacent the polarity dot 212 grounded, and its end remote from the polarity dot 212 connected to the reset right contact 259 of the output relay 255 in the right intermediate module 206. The cancel contact 286 is connected between the open-contact winding 276 of the output relay 274 and the shift conductor 218. The shift contact 287 is connected between the left control signal conductor 221 and the right isolating diode 263 at the polarity dot end of the close-contact winding 256 and the output relay 255 of the right intermediate module 206.

The right end module 207 is, like the remaining modules to be described, designed to receive information coming at an outward direction from the center and its output device, transfer that information to its shifting device, and shift the information back towards the center again. These functions could be accomplished with an output relay which had only two contacts, but the diagram illustrates the use of a separate contact which serves only to provide an output from the right end module 207, as distinguished from the previously described modules where the output terminals 242 and 265 were connected to reset contacts 232 and 258, respectively.

Just beneath the center module 205 is a lower module 208 that is very similar to the right end module 207 just described. The lower module 208 has an output device and a shifting device, and the output device consists in the main of an output relay 288 which has a close-contact winding 289, an open-contact winding 290 and three contacts. The three contacts are a transfer contact 291, an output contact 292 and a reset contact 293. The close-contact winding 289 has its polarity dot end connected through an input switch 294 to the input-cancel conductor 214, and connected to the shift down contact 248 of the shift relay 243 in the center module 205. The end of the close-contact winding 289 that is remote from the polarity dot 212 is grounded as is the polarity dot end of the open-contact winding 290. However, the end of the open-contact winding 290 which is remote from the polarity dot 212 is connected through a cancel switch 295 to the input-cancel conductor 214 and it is also connected to the shifting device. The transfer contact 291 is connected between the shift conductor 218 and the shifting device. The output contact 292 is connected between the down control signal conductor 223 and an output terminal 296, and the reset contact 293 is connected between the left signal control conductor 221 and the down isolating diode 254 at the open-contact winding 245 of the shift relay 243 in the center module 205.

The shifting device consists in the main of the shift relay 297 that has a close-contact winding 298, and an open-contact winding 299 operating two contacts, a reset contact 300 and a shift contact 301. The close-contact winding 298 has its polarity dot end conected to the transfer contact 291 of the output relay 288 and its end remote from the polarity dot 212 grounded. The open-contact winding 299 has its end adjacent the polarity dot 212 grounded and its end remote from the polarity dot 212 connected to the reset down contact 234 of the output relay 228 in the center module 205. The cancel contact 300 is connected between the shift conductor 218 and the open-contact winding 290 in the output relay 288. The shift contact 301 is connected between the up control signal conductor 225 and the downward isolating diode 240 on the polarity dot end of the close-contact winding 229 in the output relay 228 of the center module 205. The lower module 208 may receive information from the center module 205 and shift information to the center module 205.

The left module 209 is also designed to receive information from the center module 205 and transfer information to the module 205 and to accomplish that end it has an output device and a shifting device. The output device has an output relay 302 with a close-contact winding 303, an open-contact winding 304, and two contacts, a transfer contact 305 and an output and reset contact 306. The close-contact winding 303 has its polarity dot end connected through an input switch 307 to the input-cancel conductor 214 and connected to the shift left contact 247 of the shift relay 243 in the center module 205. The end of the close-contact winding 303 remote from the polarity dot 212 is grounded in common with the polarity dot end of the open-contact winding 304. However, the end of the open-contact winding 304 which is remote from the polarity dot 212 is connected through a cancel switch 308 to the input-cancel conductor 214 and it is also conducted to the shifting device. The transfer contact 305 is connected between the shift conductor 218 and the shifting device. The output and reset contact 306 is connected between the left control signal conductor 221 and the left isolating diode 252 which in turn is connected to the open-contact winding 245 of the shift relay 243 in the initial module 205. The output device is thus designed to receive information either through the input switch 307 or from the center module 205 and to transfer that information to the shifting device while automatically clearing the center module 205 of that information.

The primary component of the shifting device is the shift relay 309 which has a close-contact winding 310, and an open-contact winding 311, which function alternately to operate a cancel contact 312 and a shift contact 313. The close-contact winding 310 has its polarity dot end connected to the transfer contact 305 in the output relay 302, and its end remote from the polarity dot 212 grounded. The open-contact winding 311 has its end adjacent the polarity dot 212 grounded, and its end remote from the polarity dot 212 connected to the left reset contact 235 of the output relay 228 of the center module 205. The cancel contact 312 is connected between the open contact winding 304 of the output relay 302 and the shift conductor 318. The shift contact 313 is connected between the right control signal conductor 227 and the left isolating diode 238, which is connected to the polarity dot end of the close-contact winding 229 in the output relay 228 of the center module 205. Hence, the shifting device, can receive information from the output device through the transfer contact 312, cancel information from the output device through the cancel contact 312 and shift the information to the center module by means of the contacts 313.

The upper module 210 is very similar to the right end module 207, the lower module 208 and the left module 209. Like all of the other modules, the upper module 210 has an output device and an input device, and the output device consists in the main of an output relay 314 with a close-contact winding 315, an open-contact winding 316, and three contacts actuated by those windings 315 and 316. The three contacts are the transfer contact 317, a reset contact 318, and an output contact 319. The close-contact winding 315 has its end adjacent the polarity dot 212 connected through an input switch 320 to the input-cancel conductor 214, and that same end is also connected to the up transfer contact 249 of the shift relay 243 in the center module 205. The end of the close-contact winding 315 remote from the polarity dot 212 is connected in common with the polarity dot end of the open-contact winding 316 to ground. The end of the open-contact winding 316 which is remote from its polarity dot 212 is connected through a cancel switch 321 to the input-cancel conductor 214, and it is connected to the shifting device. The transfer contact 317 is connected between the shift conductor 218 and the shifting device. The reset contact 318 is connected between the up control conductor 225 and the up isolating diode 251 on the open-contact winding 245 of the shift relay 243 and the center module, and the output contact 319 is connected between the left control signal conductor 221 and an output terminal 322.

The shifting device as in the previously described modules is made up of a shift relay 323 having a close-contact winding 324, an open-contact winding 325, and a cancel contact 326 and a shift contact 327. The close-contact winding 324 is connected at its polarity dot end to the transfer contact 317 of the output relay 314. The end of the close-contact winding 324 which is remote from the polarity dot 212 is grounded in common with the polarity dot end of the open-contact winding 325. The open-contact winding 325 has its end remote from the polarity dot 212 connected to the reset up contact 233 of the output relay 228 in the center module 205. The cancel contact 326 is connected between the shift conductor 218 and the open contact winding 316 of the output relay 314. The shift contact 327 is connected between the down signal control conductor 223 and the up isolating diode 237 on the polarity dot end of the close-contact winding 229 of the output relay 228 in the center module 205.

The operation of the fifth, multi-directional, embodiment differs from the previous embodiments, as was indicated above, in that it is connected as a multi-directional shift register and has no beginning or end. Hence, information logically may as well be fed into one module as another, but for the sake of convenience the operation will be described as being initiated by feeding information into the central module 205. The information is fed into the central module 205 by closing the input switch 246 so that an input signal may flow from the positive pole of the battery 213 to the input-cancel conductor 214, through the input switch 236 and the close-contact winding 239 of the output relay 228 in the center module 205, entering from the end adjacent the polarity dot 212 and returning through ground to the negative pole of the battery 213. That input signal will energize the relay 228, closing the transfer contact 231 and the reset contacts 232, 233, 234, 235. If it is desired to obtain an output signal from the center module 205, the left control switch 220 may be closed, so that the signal may pass from the battery, through the shift switch 216, the left control switch 220, the left control signal conductor 221, through the contacts 232 to the output terminal 242. A reset signal will also flow from the reset right contact 232 into the open contact winding 268 of the shift relay 262 in the right intermediate module 206, having no effect on the module 206 if the shift relay 266 is at the energized stage shown, but opening the relay 266, if perchance, that relay had been latched in the closed position.

To transfer the information to the shifting device, the common terminal 215 of the shift switch 216 must be moved into contact with the right stationary contact 217, so that a transfer signal will flow from the positive pole of the battery 213 through the shift switch 216 to the shift conductor 218, through the transfer contact 231 and the close-contact winding 244 of the shift relay 243 and back to the negative pole of the battery 213 through ground. Since the signal enters from the polarity dot end of the close-contact winding 244, the cancel contact 246 and the shift contacts 247, 248, 249 and 250 will be closed. When the cancel contact 246 closes, with the common terminal 215 of the shift switch 216 in contact with the right stationary terminal 17, a cancel signal will flow from the shift conductor 218 through the cancel contact 246 and the open-contact winding 230 of the output relay 228 and back to the battery 213 through ground, causing the magnetic field of the latching magnet 211 to be canceled by a contrary magnetic field induced about the open-contact winding 238, thus permitting the contacts 231, 232, 233, 234 and 235 of the output relay 228 to open. Now, the information may be shifted into any direction desired or into all directions simultaneously.

For the purposes of discussion, assume that it is desired to shift the information from the center terminal 205 in all four directions simultaneously. To accomplish this, all of the directional switches 220, 222, 224 and 225 must be closed and the common terminal 215 of the shift switch 216 must be moved back into contact with the left stationary contact 219. Beginning with the left control switch 220, a shift signal will flow from the positive pole of the battery 213 through the shift switch 216, and the left control switch 220 to the left control signal conductor 221. From the left control signal conductor 221 current will flow through the shift left contact 247 of the shift relay 243 and the close-contact winding 303 of the output relay 302 in the left module 309 and back through ground to the negative pole of the battery 213. A shift signal passing through the down control switch 22 to the down control signal conductor 23, will also go through the shift down contact 248 of the shift relay 243 and thence to the polarity dot end of the close-contact winding 289 in the output relay 288 of the lower module 208, and return to the negative pole of the battery 213 through ground, closing the contacts 291, 292 and 293. Another shift signal passing through the up control switch 224 and the up control signal conductor 225 will go through the shift up contact 249 of the shift relay 243, and thence through the close-contact winding 313 of the output relay 314 in the upper module 210, closing the contacts 317, 318 and 319. Finally, a shift signal passing through the right control switch 226 to the right control signal conductor 227 will go through the shift right contact 250 of the shift relay 243 and from there through the close-contact winding 256 of the output relay 255 in the right intermediate module 206, closing the contacts 258, 259 and 260 of that output relay 255.

As the contacts in the lower module 208, the left module 209, the upper module 210 and the right intermediate module 206 are closed they will automatically send a reset signal through the open-contact winding 245 of the shift relay 243, opening the contacts 246, 247, 248, 249 and 250 of that relay 243. When the reset contact 293 of the output relay 288 in the lower module 208 closes, the reset signal from the left control signal conductor 221 will pass through the contact 293, the diode 254 and the open-contact winding 245 of the shift relay 243 and back to the battery 213 through ground. Similarly, when the contact 306 in the left module 209 closes, the reset signal will pass from the left control signal conductor 221 through the contact 306, the diode 252, the open-contact winding 245 of the shift relay 243 and back to the battery 213 through ground. The reset signal wall also pass from the up control signal conductor 225 through the contact 318 in the output relay 314 of the upper module 210, and the diode 251, the open-contact winding 245 of the shift relay 243 and back through ground to the battery 213. Finally, the reset signal will also flow from the right control signal conductor 227 through the reset contact 260 in the right intermediate module 206, and back through the isolating diode 253 and the open-contact winding 245 of the shift relay 243 and back to the battery 213 to ground. Each of those reset signals enters the open-contact winding 245 from its end remote from the polarity dot 212 so that they will have the effect of canceling the field of the latching magnet 211 and permitting the contacts 246, 247, 248, 249 and 250 to open. The information has now been erased or canceled from the center module 205 and resides in the lower module 208, and left module 209, the upper module 210 and the right intermediate module 206.

If it is desired to take an output signal at this point, each one of the output terminals 296, 328, 322 and 265 in the modules 208, 209, 210 and 206, respectively, will emit an output signal. To transfer the information, the common terminal 215 of the shift switch 216 must be moved into contact with the right stationary contact 217 so that a transfer signal may flow from the positive pole of the battery through a shift switch 216, to the shift conductor 218. From the shift conductor 218, the transfer signal will pass through the transfer contact 291 in the output relay 288 of the lower module 208 and the close-contact winding 298 of the shift relay 297 and back to the battery 213 through ground, energizing the shift relay 297 to close the contacts 300 and 301. The transfer signal will also flow through a transfer contact 305 in the output relay 302 of the left module, entering the close-contact winding 310 of the shift relay 309 from the polarity dot end, and returning to the negative pole of the battery 213 through ground, to energize the shift relay 309, closing the contacts 312 and 313. The transfer signal will also flow through the transfer contact 317 and the output relay 314 of the upper module 210, and through the close-contact winding 324 of the shift relay 323 and back to the negative pole of the battery 213 through ground so as to close the contacts 326 and 327 and the shift relay 323. And finally, the transfer signal will pass through the shift contact 258 in the output relay 255 of the right intermediate module 206, and from there through the close-contact winding 267 of the shift relay 266 and back through ground to the battery 213, closing the contacts 269, 270 and 271.

As each of the shift relays 266, 297, 309, and 323 are energized, their respective cancel contacts 269, 300, 312 and 326 also close, completing circuits from the shift conductor 218 through the open-contact windings 257, 290, 304 and 316, respectively, of the output relays 255, 288, 302 and 314 so that a cancel signal may pass through those windings from their ends remote from the polarity dots 212 and back to the battery 213 through ground, opening the contacts in all of the output relays 255, 288, 302, and 314. No more operations will occur in the shift register until the common terminal 215 of the shift switch 216 is moved back into contact with the left stationary contact 219 of the shift switch 216.

According to the hypothetical operation described thus far, each of the control switches 220, 222, 224 and 226 is still closed, so that if the common terminal 215 of the shift switch 216 contacts the left stationary terminal 219, information will be transferred from the right intermediate module 206 to the right end module 207, from the lower module 208 to the center module 205, from the left module 209 to the center module 205, and from the upper module 210 to the center module 205. Upon that shifting of the information, the automatic reset will go into operation, clearing the information from the right intermediate module 206, the lower module 208, the left module 209, and the upper module 210, leaving the information in the center module 205 and in the right end module 207.

Those results are obtained first by passing a shift signal through the following paths: from the left control signal conductor 221 through the shift left contact 270 in the right intermediate module 206, and the diode 239 to and through the close-contact winding 229 of the output relay 228 in the center module 205, and back to the battery 213 to ground; from the right control signal conductor 227 through the shift right contact 271 in the shift relay 266, and through the close-contact winding 275 of the output relay 274 in the right end module 207 and thence back through ground to the battery 213; from the up control signal conductor 225 through the shift contact 301 in the lower module 208, and through the diode 240 and the close-contact winding 229 of the output relay 228 in the module 205 and back through ground to the battery 213; from the right control signal conductor 227 through the shift contact 213 in the left module, and from there through the diode 238 and the close-contact winding 229 of the output relay 228 in the module 205 and back to the battery 213 through ground; and finally, from the down control signal conductor 223 through the shift contact 327 in the upper module 210, and from there through the diode 237, and the close-contact winding 229 of the output relay 228 in the center module 205 and back to the battery 213 to ground. The shift signal passing through each of those paths will enter the close-contact winding 229 from its end adjacent the polarity dot 212, so as to energize the output relay 228 closing its contacts 231, 232, 233, 234 and 235.

From the contacts of the output relays 228 and 274 in the center module 205 and the right end module 207, respectively, reset signals pass through the following paths: from the left control conductor 221, through the reset right contact 232 to the open-contact winding 268 and the shift relay 266 of the right intermediate module 206 and back to the battery 213 through ground; from the down control signal conductor 223 through the reset up contact 233 to the open-contact winding 325 of the shift 323 in the upper module 210 and back to the battery 213 through ground; from the up control signal conductor 225 through the reset down contact 234, and through the open-contact winding 299 of the shift relay 297 in the lower module 208, and thence back through ground to the battery 213; from the right control signal conductor 227, through the reset left contact 235 and the open contact winding 311 of the shift relay 309 in the left module 209; and, in the right end module 207, from the right control signal conductor 227 through the reset contact 279 and the diode 272 in the intermediate module 206, and through the open-contact winding 268 in the shift relay 266, and back to the battery 213 through ground. Each of these currents enters the respective open-contact winding 268, 299, 311, and 325 from their ends remote from the polarity dots 212 so as to open the contacts of each of those respective shift relays 266, 297, 309, and 323. Now the information fed out from the center module 205 to the lower module 208, the left module 209, and the upper module 210 is back in the center module 205, and the information fed to the intermediate module 206 is in the right end module 207.

The cycle may be completed now by returning the information in the right end module 207 back through the right intermediate module 206 to the center module 205. This is accomplished by moving the common terminal 215 of the shift switch 216 into contact with the right stationary terminal 217 of the shift switch 216 so that a transfer signal may pass through the transfer contacts 277 of the output relay 274 and the left end module 207 and enter the close-contact winding 284 of the shift relay 283 from the polarity dot end of that winding, returning to the battery 213 through ground. That transfer signal energizes the shift relay 283, closing its cancel contact 286 and its shift contact 287. When the cancel contact 286 closes, a cancel signal passes through that contact 286 and the open-contact winding 276 of the output relay 274 so as to deenergize the output relay 274, opening its contacts 277, 278 and 279.

Since it is desired to shift this information to the left, each of the directional switches 222, 224 and 226, except the left control signal 226 will be opened, and then the common terminal 215 of the shift switch 216 will be moved into contact with the left stationary terminal 219 so that current will flow from the positive pole of the battery 213 through the left control switch 220 to the left control signal conductor 221 and the shift contact 287 in the shift relay 283 of the right end module 207. From the right end module 207, a shift signal passes leftward to the right intermediate module 206 and enters the close-contact winding 256 of the output relay 255 through the isolating diode 263 at the polarity dot end of that winding, returning to the battery 213 through ground. The shift signal energizes the output relay 255, closing its contacts 258, 259 and 260. When the contact 259 closes, a reset signal will pass from the left control signal conductor 229, through the contact 259 and the open-contact winding 285 of the shift relay 283 in the right end module 207, deenergizing the relay 283 so that its contacts 286 and 287 are open. The information is now in the right intermediate module 206 and has been erased from the right end module 207.

Now the common terminal 215 of the shift switch 216 is moved into contact with the right stationary terminal 217 so that a transfer signal can flow from the positive pole of the battery 213 to the shift conductor 218, through the transfer contacts 258 of the output relay 255 and the right intermediate module 206, the through the close-contact winding 267 of the shift relay 266 and back to the battery 213 through ground. The transfer signal energizes the shift relay 266 closing its contacts 269, 270 and 271. When the cancel contact 269 closes, a cancel signal flows from the shift conductor 218 through the cancel contact 269 and the open-contact winding 257 in the output relay 259 and back through ground to the battery 213. The cancel signal, entering the open-contact winding 257 from the end remote from the polarity dot 212 deenergizes the output relay 255 permitting the contacts 258, 259 and 260 to open. Now the common terminal 215 of the shift switch 216 is moved into contact with the left stationary terminal 219 so a shift signal will flow from the positive pole of the battery through the swift switch 216 and the left control switch 220 to the left control signal conductor 221. From the left control signal conductor 221 the shift signal will pass through the shift left contact 270 and the shift relay 266, and back through the isolating diode 239, to enter the close-contact winding 229 of the output relay 288 in the center module 205 and from there back to the battery 213 throught ground. Had that relay 228 not been energized, but had been in the condition shown in the drawing the signal just described would have caused that relay 228 to be energized, closing its contacts so that a reset signal would pass through the left control signal conductor 221, the reset right contact 232, the diode 273 and the open-contact winding 268 of the shift relay 266 in the right intermediate module 206, to deenergize the relay 266 and permits the contacts 269, 270 and 271 to open. Now the information originally fed into the center module 205 has passed through the entire shift register and returned to the center module 205 and resides only in the output relay 228 of that module.

In the foregoing description, the signal was fed in through the input switch 236 to the center module 205. It will be apparent that the current might have been fed through any one of the input switches 261, 280, 294, 307 or 320 of the respective modules 206, 207, 208, 209 or 210. Also, the information might be cancelled in any one of those modules by closing the appropriate cancel switch 241, 264, 281, 295, 308 or 321. Although in the foregoing description, the information was simultaneously fed out of the center module 205 and back to the center module 205, it will be abundantly apparent that the information might have been fed individually to each one of the modules 206, 208, 209 or 210 by selectively closing the appropriate control switch 220, 222, 224 or 226 as was shown in part in transferring the information from the terminal right end module 207 back to the center module 205 through the intermediate module 206.

In each of the foregoing embodiments, the output device might have been any one of the many different flipflops available. However, the common element to each of the embodiments is the use of a relay as a shifting device, to convey the information from the output device to the succeeding module. This relay, common to each of the embodiments, is latched relay with two windings so oriented that one winding works to close the contacts and the other winding works to open the contacts. In each of the relays, there is at least one contact, but the number of contacts used depends upon the number of directions in which information is to transferred by the relay, except that in two of the embodiments of the unidirectional relay two contacts are used whereas in two others, the second and fourth, only one contact is used. Throughout the foregoing description, the term "direction" is not to be taken in its literal sense, since the points on a compass are totally irrelevant here, but rather it is to be treated as a methaphor intended to convey the idea that information may be shifted along one or more chains or shift register modules. In addition to the relays, the foregoing embodiments have contained a number of switches, but it is to be understood that the switches shown in the diagrams are merely illustrative of the function which could be carried out by anything from a push button to a pulse generator. Bearing in mind the many variations possible in the foregoing embodiments without departing from my invention, my invention is set forth in the following numbered paragraphs.

I claim:

1. A relay transfer shift register module comprising the combination of a device for receiving information into the module connected to an external signal source to be energized by an input signal from said external signal source, and connected to be deenergized by a cancel signal, and having means to emit a transfer signal when said output device is energized; and a shifting deivce for shifting information out of the module including as its essential operative component a relay having a latched contact means actuable to energized and deenergized states, an energizing winding connected to said output device to receive a transfer signal from said output deivce to actuate said contact means to said energized stated, and a deenergizing winding connected to an external source to receive asignal from said external source to restore said contact means to said deenergized state;

said contact means in said energized state being connected to conduct a signal out of said module and to conduct said cancel signal to said output device, and said contact means including a single set of contacts connected through a first isolating diode to conduct said cancel signal to said output device and connected through a second isolating diode to conduct said signal out of said module.

2. A relay transfer shift register module comprising the combination of a device for receiving information into the module connected to an external signal source to be energized by an input signal from said external signal source, and connected to be deenergized by a cancel signal, and having means to emit a transfer signal when said output device is energized;

said device for receiving information into the module including an output relay having two windings to actuate a latched contact means, one of said windings being an energizing winding connected to receive said input signal to actuate said contact means to an energized state, the other of said windings being a deenergizing winding connected to receive said cancel signal to restore said contact means to a deenergized state, and said contact means being connected in said energized state to emit said transfer signal;

said contact means in said device for receiving information into said module including a single set of contacts connected through a first isolating diode to emit said transfer signal and through a second isolating diode to emit an output signal; and a shifting device for shifting information out of the module including as its essential operative component a relay having a latched contact means actuatable to energized and deenergized states, an energizing winding connected to said output device to receive a transfer signal from said output device to actuate said contact means to said energized state, and a deenergizing winding connected to an external source to receive a signal from said external source to restore said contact means to said deenergized state;

said contact means in said shifting device in said energized state being connected to conduct a signal out of said module and to conduct said cancel signal to said output device and having a single set of contacts connected through a third isolating diode to conduct said transfer signal and through a fourth isolating diode to conduct said signal out of said module.

3. A shift register comprising the combination of a plurality of modules as set forth in claim 2 connected in succession so that in at least all but one of the modules said fourth isolating diode is connected to said energizing winding of said device for receiving information in an adjacent module.

References Cited

UNITED STATES PATENTS 3,042,900 7/1962 Werts -------------- 340—168

TERRELL W. FEARS, Primary Examiner

U.S. Cl. X.R.

200—105; 317—123